United States Patent
Anjo

(10) Patent No.: US 11,151,615 B2
(45) Date of Patent: Oct. 19, 2021

(54) ADVERTISEMENT MANAGEMENT APPARATUS, ADVERTISEMENT MANAGEMENT METHOD, AND COMPUTER READABLE STORAGE MEDIUM

(71) Applicant: CASIO COMPUTER CO., LTD., Tokyo (JP)

(72) Inventor: Keita Anjo, Kodaira (JP)

(73) Assignee: CASIO COMPUTER CO., LTD., Tokyo (JP)

(*) Notice: Subject to any disclaimer, the term of this patent is extended or adjusted under 35 U.S.C. 154(b) by 0 days.

(21) Appl. No.: 16/358,264

(22) Filed: Mar. 19, 2019

(65) Prior Publication Data
US 2019/0295132 A1 Sep. 26, 2019

(30) Foreign Application Priority Data

Mar. 23, 2018 (JP) .............................. JP2018-056181
Mar. 7, 2019 (JP) .............................. JP2019-041446

(51) Int. Cl.
G06Q 30/00 (2012.01)
G06Q 30/02 (2012.01)
(Continued)

(52) U.S. Cl.
CPC ..... *G06Q 30/0276* (2013.01); *G06F 3/04845* (2013.01); *G06F 3/1204* (2013.01);
(Continued)

(58) Field of Classification Search
None
See application file for complete search history.

(56) References Cited

U.S. PATENT DOCUMENTS 8,091,031 B2 * 1/2012 Evans .................... G06Q 30/02
715/744
10,789,606 B1 * 9/2020 Datar ................. G06Q 30/0207
(Continued)

FOREIGN PATENT DOCUMENTS

JP 2002144641 A 5/2002
JP 2004062712 A 2/2004
(Continued)

OTHER PUBLICATIONS

Lee, K. P., and K. Miller. "A positive attitude-ad-brand relationship by customising banner advertisement design-an empirical study." Australian and New Zealand Marketing Academy Conference. ANZMAC, 2003. (Year: 2003).*
(Continued)

*Primary Examiner* — Michael Bekerman
(74) *Attorney, Agent, or Firm* — Holtz, Holtz & Volek PC

(57) ABSTRACT

An advertisement management apparatus includes a memory, at least one processor, and at least one program. The program is stored in the memory and executed by the processor, and includes a first selection processing operation, an extraction processing operation, a second selection processing operation, and a creation processing operation. The first selection processing operation is selecting, based on a use of an advertisement input by a user, a layout as a first advertisement component of the advertisement. The extraction processing operation is extracting a word by performing text segmentation on text information input by the user. The second selection processing operation is selecting a second advertisement component of the advertisement based on the extracted word. The creation processing operation is creating an advertisement candidate by combining the selected layout and the selected second advertisement component.

16 Claims, 13 Drawing Sheets

(51) Int. Cl.
*G06F 3/0484* (2013.01)
*G06F 3/12* (2006.01)
*G06F 40/279* (2020.01)
*H04W 4/23* (2018.01)
*G06Q 50/00* (2012.01)

(52) U.S. Cl.
CPC .......... *G06F 3/1251* (2013.01); *G06F 3/1257* (2013.01); *G06F 40/279* (2020.01); *G06Q 50/01* (2013.01); *H04W 4/23* (2018.02)

(56) References Cited

U.S. PATENT DOCUMENTS

| | | | | |
|---|---|---|---|---|
| 2006/0277102 | A1* | 12/2006 | Agliozzo | G06Q 30/0254 705/14.41 |
| 2007/0266326 | A1* | 11/2007 | Evans | G06Q 30/02 715/747 |
| 2008/0040175 | A1* | 2/2008 | Dellovo | G06Q 30/0242 705/7.36 |
| 2009/0030781 | A1* | 1/2009 | Mehta | G06Q 30/0277 705/14.72 |
| 2010/0198696 | A1* | 8/2010 | Deshpande | G06Q 30/02 705/14.72 |
| 2010/0324997 | A1* | 12/2010 | Evans | G06Q 30/0273 705/14.69 |
| 2011/0196748 | A1* | 8/2011 | Caron | G06Q 30/02 705/14.72 |
| 2011/0208579 | A1* | 8/2011 | Krishnamoorthy | G06Q 30/02 705/14.45 |
| 2014/0136304 | A1* | 5/2014 | Baluja | G06Q 30/02 705/14.6 |
| 2014/0214529 | A1* | 7/2014 | Gross-Baser | G06Q 30/0276 705/14.45 |
| 2016/0110082 | A1* | 4/2016 | Zhang | G06F 40/106 715/765 |
| 2017/0161794 | A1* | 6/2017 | Zhu | G06Q 30/00 |
| 2018/0096399 | A1* | 4/2018 | Delayen | G06F 40/106 |
| 2018/0189823 | A1* | 7/2018 | Xie | G06Q 30/0241 |
| 2018/0276718 | A1* | 9/2018 | Thomas | G06Q 30/0276 |

FOREIGN PATENT DOCUMENTS

| | | | | |
|---|---|---|---|---|
| JP | 2005128677 | A | 5/2005 | |
| JP | 2013196440 | A | 9/2013 | |
| WO | WO-9808176 | A1 * | 2/1998 | ............. G06Q 30/02 |
| WO | WO-0201391 | A2 * | 1/2002 | ......... G06Q 30/0241 |

OTHER PUBLICATIONS

Shaouf, Abubaker A. AB. "Revising the effects of online advertising attributes on consumer processing and response." International Journal of Marketing Studies 10.1 (2018): 39-53. (Year: 2018).*

* cited by examiner

| LAYOUT TYPE | COORDINATE DATA | PORTRAIT/ LANDSCAPE | PICTURE SIZE | NUMBER OF PICTURES | EYE-CATCHER SIZE | NUMBER OF ILLUSTRATIONS | ... |
|---|---|---|---|---|---|---|---|
| L1 | COORDINATES A | 1 | 1.0 | 1 | 0.7 | 1 | ... |
| L2 | COORDINATES B | 1 | 0.4 | 2 | 0.6 | 2 | ... |
| L3 | COORDINATES C | 0 | 0.9 | 1 | 0.3 | 3 | ... |
| ... | ... | ... | ... | ... | ... | ... | ... |
| L40 | COORDINATES T | 0 | 0.0 | 0 | 0.9 | 6 | ... |

| EYE-CATCHER TYPE | WORDS | PORTRAIT/ LANDSCAPE | FOR JAPANESE FOOD | FOR WESTERN FOOD | FOR CAFE | FOR CHINESE FOOD | ... |
|---|---|---|---|---|---|---|---|
| i1 | DELICACIES OF WINTER | 0 | 1 | 1 | 1 | 0 | ... |
| i2 | CHEF'S RECOMMENDATION | 0 | 1 | 0 | 1 | 1 | ... |
| i3 | SPECIAL MENU | 0 | 0 | 1 | 1 | 0 | ... |
| i4 | DISHES FOR SUMMER SEASON ONLY USING PLENTY OF FRESH SUMMER VEGETABLES | 0 | 1 | 1 | 1 | 1 | ... |
| ... | ... | ... | ... | ... | ... | ... | ... |
| i40 | LIMITED PORTIONS AVAILABLE | 1 | 1 | 0 | 0 | 0 | ... |

| USE:DESTINATION | COMPONENTS-SELECTING-PURPOSE CONDITION | | | RESOLUTION OF OUTPUT IMAGE |
|---|---|---|---|---|
| | FITTING INTO LAYOUT OF WEBSITE | FONT SIZE | ... | |
| PRINT:OUT-STORE | NOT REQUIRED | 0.6 OR MORE | ... | 300dpi |
| PRINT:IN-STORE | NOT REQUIRED | ANY | ... | 300dpi |
| WEBSITE:SMARTPHONE | FITTING | ANY | ... | 150dpi |
| WEBSITE:PC | FITTING | 0.6 OR MORE | ... | 150dpi |
| SOCIAL MEDIA | NOT REQUIRED | 0.6 OR MORE | ... | 150dpi |

FIG.6

| USER CODE | USE: DESTINATION | LAYOUT | | | EYE-CATCHER | | | | FONT | | |
|---|---|---|---|---|---|---|---|---|---|---|---|
| | | PORTRAIT/ LANDSCAPE | PICTURE SIZE | EYE-CATCHER SIZE | FOR JAPANESE FOOD | FOR WESTERN FOOD | FOR CAFE | FOR CHINESE FOOD | FONT A | FONT B | FONT C |
| 000001 | PRINT: OUT-STORE | 0.3 | 0.6 | 0.7 | 0.2 | 0.9 | 0.7 | 0.5 | 0 | 0.7 | 0.3 |
| | PRINT: IN-STORE | 0.3 | 0.5 | 0.5 | 0.1 | 0.8 | 0.8 | 0.6 | 0.1 | 0.8 | 0.2 |
| | WEBSITE: SMARTPHONE | 0 | 0.3 | 0.5 | 0.3 | 0.7 | 0.6 | 0.4 | 0 | 0.7 | 0.1 |
| | WEBSITE: PC | 0.1 | 0.4 | 0.6 | 0.2 | 0.8 | 0.6 | 0.5 | 0.2 | 0.7 | 0.2 |
| | SOCIAL MEDIA | 0.3 | 0.7 | 0.6 | 0.1 | 0.9 | 0.7 | 0.5 | 0 | 0.7 | 0.3 |
| ... | ... | ... | ... | ... | ... | ... | ... | ... | ... | ... | ... |

| | WORD | PART OF SPEECH | PORTRAIT/ LANDSCAPE | FOR JAPANESE FOOD | FOR WESTERN FOOD | FOR CAFE | FOR CHINESE FOOD | ... |
|---|---|---|---|---|---|---|---|---|
| ARTICLE NAME | PIZZA | NOUN | 1 | 0 | 1 | 1 | 0 | ... |
| | WITH | PREPOSITION | 0 | 0 | 0 | 0 | 0 | ... |
| | TOMATO | NOUN | 1 | 1 | 1 | 0 | 0 | ... |
| | AND | CONJUNCTION | 0 | 0 | 0 | 0 | 0 | ... |
| | PROSCIUTTO | NOUN | 1 | 0 | 1 | 0 | 0 | ... |
| ADVERTISING SLOGAN | VEGETABLES | NOUN | 1 | 1 | 1 | 0 | 1 | ... |
| | DELICIOUS | ADJECTIVE | 1 | 1 | 1 | 0 | 1 | ... |
| | IN | PREPOSITION | 0 | 0 | 0 | 0 | 0 | ... |
| | SUMMER | NOUN | 1 | 1 | 1 | 1 | 1 | ... |
| SUM OF CHARACTERISTIC VALUES OF WORDS | | | 0.667 | 4 | 6 | 2 | 3 | ... |

ADVERTISEMENT MANAGEMENT APPARATUS, ADVERTISEMENT MANAGEMENT METHOD, AND COMPUTER READABLE STORAGE MEDIUM

CROSS-REFERENCE TO RELATED APPLICATIONS

This application is based upon and claims the benefit of priority from the prior Japanese Patent Application No. 2018-056181 filed on Mar. 23, 2018, and Japanese Patent Application No. 2019-041446 filed on Mar. 7, 2019, the entire contents of which are incorporated herein by reference.

BACKGROUND OF THE INVENTION

1. Field of the Invention

The present invention relates to an advertisement management apparatus, an advertisement management method, and a computer readable storage medium.

2. Description of the Related Art

Advertisement creation apparatuses, which create advertisements for point-of-purchase (POP) advertising have (which hereinafter may be referred to as "POP advertisements" or simply "POPS") been developed in order to enhance sales promotion. As an example of such advertisement creation apparatuses, for example, there is disclosed and proposed in JP 2005-128677 A a print creation system which creates one POP on the basis of contents of a layout, a recipe example and a logo selected by a user, contents of a comment and a sales price input by the user, and so forth.

SUMMARY OF THE INVENTION

However, the above conventional technology requires that the user selects or inputs information for each component of the POP, which is troublesome to the user. In addition, the created POP is constituted of the pieces of information selected or input by the user arranged at predetermined positions. That is, the conventional technology can create only designs which are within the scope of the user's assumption.

Objects of the present invention include providing an advertisement management apparatus, an advertisement management method, and a computer readable storage medium which can create diverse advertisements with simpler input operations.

According to a first aspect of the present invention, there is provided an advertisement management apparatus including: a memory; at least one processor; and at least one program which is stored in the memory, and executed by the at least one processor, wherein the at least one program includes: a first selection processing operation of selecting, based on a use of an advertisement input by a user, a layout as a first advertisement component of the advertisement; an extraction processing operation of extracting a word by performing text segmentation on text information input by the user; a second selection processing operation of selecting a second advertisement component of the advertisement different from the layout based on the word extracted by the extraction processing operation; and a creation processing operation of creating an advertisement candidate by combining the layout selected by the first selection processing operation and the second advertisement component, which is different from the layout, selected by the second selection processing operation.

According to a second aspect of the present invention, there is provided an advertisement management method for an advertisement management apparatus including a memory and at least one processor, including: a first selection step of selecting, based on a use of an advertisement input by a user, a layout as a first advertisement component of the advertisement; an extraction step of extracting a word by performing text segmentation on text information input by the user; a second selection step of selecting a second advertisement component of the advertisement different from the layout based on the word extracted in the extraction step; and a creation step of creating an advertisement candidate by combining the layout selected in the first selection step and the second advertisement component, which is different from the layout, selected in the second selection step.

According to a third aspect of the present invention, there is provided a non-transitory computer readable storage medium storing a program to cause a computer of an advertisement management apparatus to perform a processing operation including: a first selection processing operation of selecting, based on a use of an advertisement input by a user, a layout as a first advertisement component of the advertisement; an extraction processing operation of extracting a word by performing text segmentation on text information input by the user; a second selection processing operation of selecting a second advertisement component of the advertisement different from the layout based on the word extracted by the extraction processing operation; and a creation processing operation of creating an advertisement candidate by combining the layout selected by the first selection processing operation and the second advertisement component, which is different from the layout, selected by the second selection processing operation.

BRIEF DESCRIPTION OF THE DRAWINGS

The accompanying drawings, which are incorporated in and constitute apart of the specification, illustrate embodiments of the invention, and together with the general description given above and the detailed description of the embodiments given below, serve to explain the principles of the invention, wherein:

FIG. 3 shows an example of a layout data table stored in a storage;

FIG. 4 shows an example of an eye-catcher data table stored in the storage;

FIG. 5 shows an example of a components-selecting-purpose condition data table stored in the storage;

FIG. 6 shows an example of a learning value data table stored in the storage and updated each time a POP data creation process is performed;

FIG. 19 shows, for each item, the sum of characteristic values of words obtained from information input by a user.

DETAILED DESCRIPTION OF THE PREFERRED EMBODIMENTS

Hereinafter, one or more embodiments for carrying out the present invention will be described with reference to the drawings. The embodiment(s) described below is provided with various limitations technically preferable for carrying out the present invention. However, the scope of the present invention is not limited to the embodiment(s) below or illustrated examples.

«Configuration of Advertisement Management System»

Figure 1:
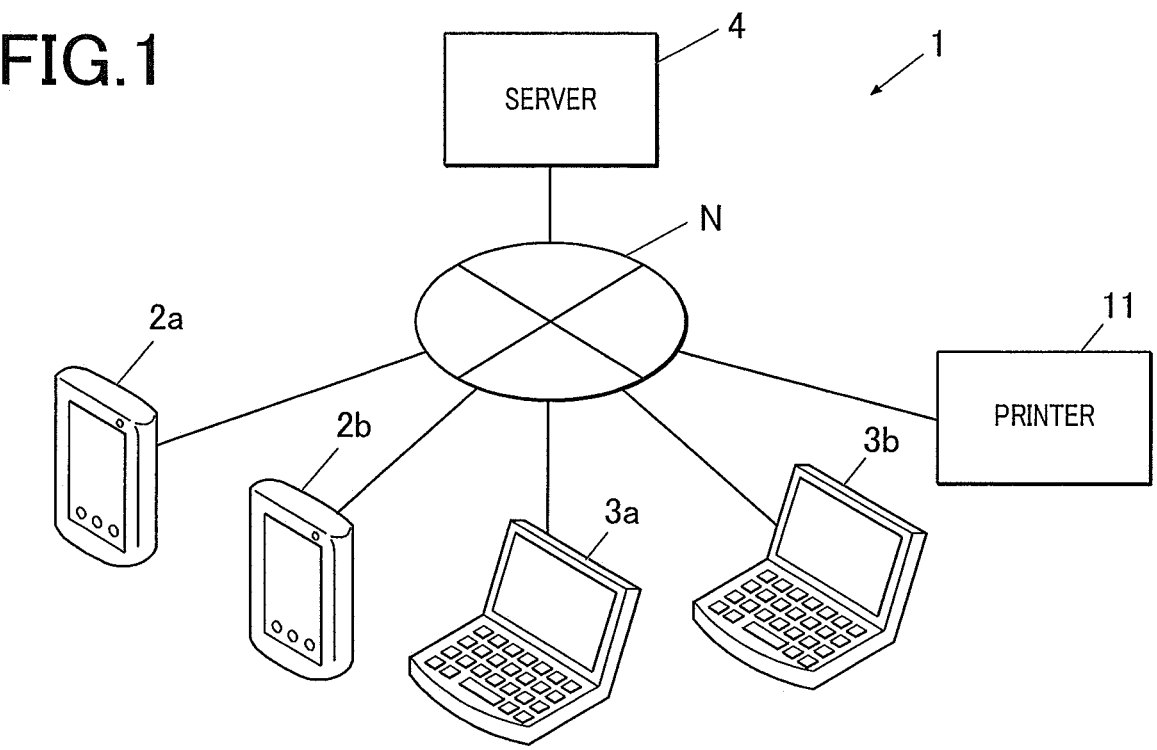
FIG. 1 is a diagram schematically showing configuration of an advertisement management system according to an embodiment(s)

With reference to FIG. 1, configuration of an embodiment(s) will be described. FIG. 1 is a diagram schematically showing configuration of an advertisement management system 1 according to an embodiment(s).

The advertisement management system 1 of the embodiment extracts words by performing text segmentation on text information input by a user(s), selects POP data components on the basis of the extracted words, and creates POP candidate data as an advertisement candidate(s) by combining the selected POP data components. Further, the advertisement management system 1 creates the POP candidate data suitable for a POP's uses) (destination(s)) input by the user.

As shown in FIG. 1, the advertisement management system of the embodiment includes: a server (advertisement management apparatus) 4; portable terminals 2a and 2b as user terminals, such as smartphones or tablet terminals; personal computers (PCs) 3a and 3b as user terminals; and a printer 11. These apparatuses communicate and connect with one another via a communication network N. Hereinafter, the portable terminals 2a and 2b and the PCs 3a and 3b may be simply referred to as "user terminals". As mentioned above, the portable terminals 2a and 2b and the PCs 3a and 3b communicate and connect with the server 4. However, this is not intended to limit the present invention. For the number of users who enjoy services provided by the server 4, user terminals are present, and communicate and connect with the server 4. Further, as user terminals, point-of-sales (POS) terminals and so forth may communicate and connect with the server 4.

The server 4 creates POP data as advertisements for sales promotion, and manages the created POP data. Further, in response to requests from the user terminals, the server 4 distributes, to the user terminals, input screens 5 and 6 where input information for creating POP data is input, a preview screen (not shown) where created POP candidate data is displayed, and so forth.

The user terminals, such as the portable terminals 2a and 2b, receive and display various types of display information sent from the server 4, and also receive operation inputs from the users, and send operational information thereon to the server 4.

The printer 11 is a home or business printer employing an electrophotographic system, an inkjet system or the like, and, in response to input print instructions, prints, for example, POP data on sheets of paper, thereby creating POPs as advertisements.

The communication network N is constituted of Internet, but may include a local area network (LAN), a wide area network (WAN) and/or the like, and also may include a telephone line, a leased line, a mobile communication network, a communication satellite network, a cable television (CATV) line and/or the like.

Further, the advertisement management system 1 may be configured to execute other application programs which are used by the various user terminals. Examples of the application programs include programs for: sales management business including calculation and analysis of daily/monthly sales at each store or the like; accounting management business including tax payment of a property tax, an individual enterprise tax, and so forth; salary/wages management business including calculation of salary/wages of employees; employment management business including management of shift work at each store or the like and attendance management of employees; and document management business including creation and management of documents to notify associated companies/businesspersons and employees about matters. The advertisement management system 1 may be configured to execute these programs, thereby functioning as a management support system.

«Configuration of Server 4»

Figure 2:
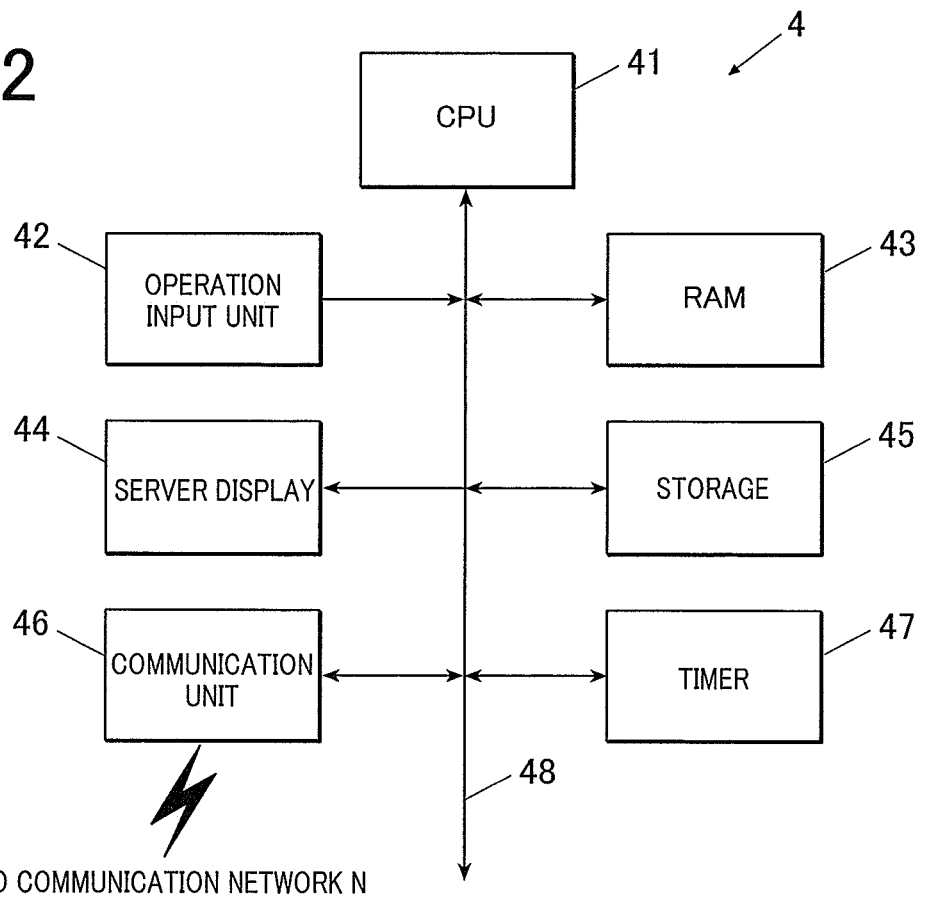
FIG. 2 is a block diagram showing functional configuration of a server.

Internal configuration of the server 4 will be described. FIG. 2 shows the internal configuration of the server 4. FIG. 3, FIG. 4, FIG. 5, and FIG. 6 show examples of a layout data table 451, an eye-catcher data table 452, a components-selecting-purpose condition data table 453, and a learning value data table 454, respectively.

As shown in FIG. 2, the server 4 includes a central processing unit (CPU) 41, an operation input unit 42, a random access memory (RAM) 43, a server display 44, a storage 45, a communication unit 46, and a timer 47. These units or the like connect with one another via a bus 48.

The CPU 41 reads a system program(s) from the storage 45 where system programs are stored, loads the read system program to a work area of the RAM 43, and controls the units or the like of the server 4 in accordance with the loaded system program. The CPU 41 also reads a process program(s) from the storage 45 where process programs for various processes are stored, loads the read process program to the work area, and performs a process among the various processes in accordance with the loaded process program. The various processes include processes on the server 4's side of a POP data creation process, a first obtainment process, and a second obtainment process, which will be described below. The CPU 41 thus functions as a first selection unit, an extraction unit, a second selection unit, and a creation unit.

The operation input unit 42 includes a keyboard including cursor keys, letter input keys, numeral input keys, and other various function keys, and receives inputs from a user of the server 4 pressing the keys, and outputs operational information thereon to the CPU 41. The operation input unit 42 may include a pointing device, such as a mouse, and receive positional inputs, and output the positional inputs as operational information to the CPU 41.

The RAM 43 is a volatile memory. The RAM 43 has the work area where, for example, any of the various programs to be executed by the CPU 41 and data for the program(s) are stored.

The server display 44 is constituted of a liquid crystal display (LCD), a cathode ray tube (CRT) or the like, and displays screens in response to display control signals from the CPU 41.

The storage 45 is constituted of a hard disk drive (HDD) having a magnetic storage medium, for example. The storage 45 stores: the system programs, the process programs, and the application programs, such as a Web server program, which are executed by the CPU 41; data necessary for execution of these programs; and so forth. The process programs include programs to perform various processes including the processes on the server 4's side of the POP data creation process, the first obtainment process, and the second obtainment process, which will be described below.

These programs are stored in the storage 45 in the form of computer readable program codes. The CPU 41 operates in accordance with the program codes.

The storage 45 also stores, in advance, various data which are used in the POP data creation process and so forth. That is, the storage 45 stores POP data components (POP-data-component types of each POP data component) including: layout(s) (layout types) for POP data; and eye-catcher (s) (eye-catcher types), font (s) (font types), font color(s) (font-color types), background(s) (background types), outline(s) (outline types), and illustration(s) (illustration types) which are contained in POP data. The storage 45 also stores, for example, about each user terminal's user, user information containing a type of business and/or a type of operation of a store or a company which the user runs or belongs to.

In the embodiment(s), the "eye-catcher" is a portion which attracts people's attention first in the whole advertisement (POP), and is formed of an image showing a string of words mainly for sales promotion.

The storage 45 also stores the layout data table 451 (FIG. 3), the eye-catcher data table 452 (FIG. 4), the components-selecting-purpose condition data table 453 (FIG. 5), and the learning value data table 454 (FIG. 6) which are used in the first obtainment process and the second obtainment process described below. The storage 45 also stores like data tables (not shown) about the other POP data components, namely, data tables about the font, the font color, the background, the outline, and the illustration.

The layout data table 451 is a table where each of layout types L1 to L40 is associated and stored with index values set for respective items. The items are not limited to but include "Portrait/Landscape", "Picture Size", "Number of Pictures", "Eye-catcher Size", and "Number of Illustrations". In the item "Portrait/Landscape", if a layout type is portrait, "0" is set as its index value, whereas if a layout type is landscape, "1" is set as its index value. In the item "Picture Size" and the item "Eye-catcher Size", index values closer to "1" indicate a larger image data size and a larger eye-catcher size with respect to the whole POP data to be created.

The items in the layout data table 451 include, in addition to the items shown in FIG. 3, at least all items under a components-selecting-purpose item in the components-selecting-purpose condition data table 453 described below, and each of the layout types L1 to L40 is associated and stored with index values set for the respective items too.

The eye-catcher data table 452 is a table where each of eye-catcher types i1 to i40 is associated and stored with index values set for respective items. The items are not limited to but include "Portrait/Landscape", "for Japanese Food", "for Western Food", "for Cafe", and "for Chinese Food". In the item "Portrait/Landscape", if an eye-catcher type is portrait, "0" is set as its index value, whereas if an eye-catcher type is landscape, "1" is set as its index value. In each of the item "for Japanese Food", the item "for Western Food", the item "for Cafe", and the item "for Chinese Food", if an eye-catcher type is suitable for the item, "1" is set as its index value, whereas if an eye-catcher type is unsuitable for the item, "0" is set as its index value.

The components-selecting-purpose condition data table 453 is a table where each of POP's uses (destinations) is associated and stored with components-selecting-purpose conditions (or index values) set for respective items. The items are not limited to but include "Fitting into Layout of Website" and "Font Size". In the item "Fitting into Layout of Website", for a POP's use which does not require fitting a POP into a layout of a store's website, "Not Required" is set as its components-selecting-purpose condition, whereas for a POP's use which requires fitting a POP into a layout of a store's website, "Fitting" is set as its components-selecting-purpose condition. More specifically, for example, if the POP's use is "Website (Smartphone)", it is necessary to make an aspect ratio of a POP fit a POP output region set by a layout of a website for smartphones, and hence "Fitting" is set as its components-selecting-purpose condition. In the item "Font Size", for each POP's use, a font size for, for example, an article-of-commerce name(s), price(s) and advertising slogan(s) which are used in a POP is set as its components-selecting-purpose condition. More specifically, for example, if the POP's use is "Print (Out-store)", "0.6 or more" is set as its components-selecting-purpose condition (index value) to make the font large because a POP needs to attract people's attention. In the item "Font Size", index values closer to "1" indicate a larger font size with respect to the whole POP data to be created.

The items in the components-selecting-purpose condition data table 453 include, in addition to the items shown in FIG. 5, at least all the items in the layout data table 451 described above, and each of the POP's uses (destinations) is associated and stored with components-selecting-purpose conditions (or index values) set for the respective items too. Among the items, for an item(s) which is/are not shown in the components-selecting-purpose condition data table 453, the components-selecting-purpose conditions (or index values) associated and stored with the respective POP's uses (destinations) may all be "Any" or the like.

In the components-selecting-purpose condition data table 453, each of the POP's uses (destinations) is also associated and stored with resolution of an output image.

The learning value data table 454 is a table where a user code of each of users who receive services provided by the server 4 is associated and stored with learning values which indicate user's preference about the POP data components, and are calculated and updated for the respective POP's uses (destinations) of the user. The learning values are also calculated and updated for respective items preset for each POP data component. The items are not limited to but include: "Portrait/Landscape", "Picture Size", and "Eye-catcher Size" as the items of the layout; "for Japanese Food", "for Western Food", "for Cafe", and "for Chinese Food" as the items of the eye-catcher; and "Font A", "Font B", and "Font C" as the items of the font. The learning value data table 454 is updated each time the POP data creation process is performed. In the item "Portrait/Landscape", learning values closer to "1" indicate that the user prefers a landscape layout at a higher degree. In the item "Picture Size" and the item "Eye-catcher Size", learning values closer to "1" indicate that the user prefers, at a higher degree, a large image data size and a large eye-catcher size with respect to the whole POP data to be created.

The storage 45 also stores, in advance, characteristic values set for each word. The characteristic values are set for respective items, and used to obtain sums of characteristic values of words (i.e., sums of words' characteristic values) in the second obtainment process described below. The items overlap with the items in the learning value data table 454. For example, the items are "Portrait/Landscape", "for Japanese Food", "for Western Food", "for Cafe", and "for Chinese Food". In the item "Portrait/Landscape", if a word is suitable for portrait arrangement (layout), "0" is set as its characteristic value, whereas if a word is suitable for landscape arrangement (layout), "1" is set as its characteristic value. In each of the item "for Japanese Food", the item "for Western Food", the item "for Cafe", and the item "for Chinese Food", if a word is suitable for the item, "1" is set as its characteristic value, whereas if a word is unsuitable for the item, "0" is set as its characteristic value. Further, for each word which is not any of a noun, an adverb, a verb, and an adjective, but is another part of speech, and for each symbol, "0" is set as their characteristic values (in an item "Part of Speech"). For example, about a word "Tomato", which is a noun, in the item "Portrait/Landscape", the item "for Japanese Food", the item "for Western Food", the item "for Cafe", and the item "for Chinese Food", "1", "1", "1", "0", and "0" are set as its characteristic values, respectively. Further, about a word "with", which is a preposition, in all the items, "0" is set as its characteristic values.

The storage 45 also stores various data input by the user(s) during the POP data creation process and so forth. That is, the storage 45 stores, for example, image data input on the input screen 5, and a creation history (record(s)) of POP data created so far.

The storage 45 also stores layout data of websites for smartphones and layout data of websites for PCs of stores or the like which the respective users run or belong to. More specifically, for example, the storage 45 stores, as each layout data, aspect ratio information on a region where POP data is output (i.e., the POP output region) on a website. If a user changes a layout of a website, the layout data of the website stored in the storage 45 is updated with the changed layout data.

The communication unit 46 includes a modem, a terminal adapter (TA), a router, and a network card. The communication unit 46 communicates and connects with external apparatuses on the communication network N, such as the user terminals, and exchanges data with the external apparatuses.

The timer 47 has a built-in timer circuit, and measures and outputs the current date and time as current time information.

«Configuration of Portable Terminal 2a»

Figure 7:
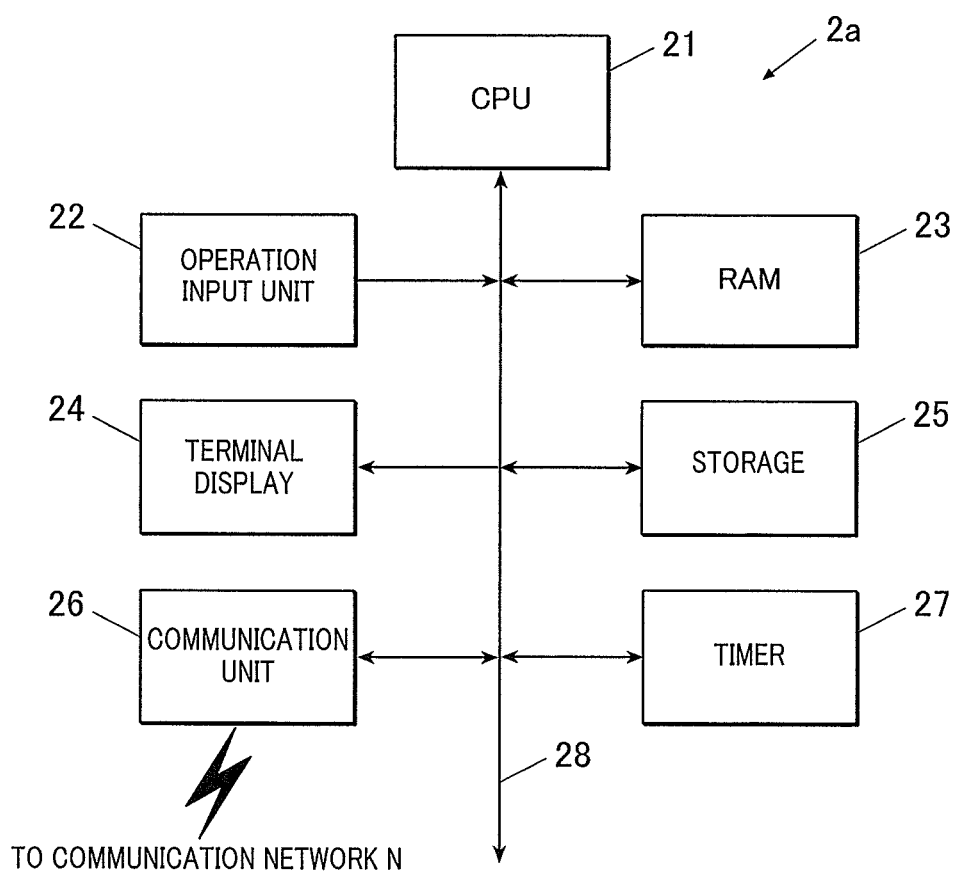
FIG. 7 is a block diagram showing functional configuration of a portable terminal.

Internal configuration of the portable terminal 2a, which is an example of the user terminals, will be described. FIG. 7 shows the internal configuration of the portable terminal 2a.

As shown in FIG. 7, the portable terminal 2a includes a CPU 21, an operation input unit 22, a RAM 23, a terminal display 24, a storage 25, a communication unit 26, and a timer 27. These units or the like connect with one another via a bus 28.

The portable terminal 2b and the PCs 3a and 3b are configured similarly.

The CPU 21, the operation input unit 22, the RAM 23, the terminal display 24, the storage 25, the communication unit 26, and the timer 27 are similar in configuration to the CPU 41, the operation input unit 42, the RAM 43, the server display 44, the storage 45, the communication unit 46, and the timer 47 of the server 4, respectively. Hereinafter, different points will be described mainly.

The CPU 21 reads a system program(s) from the storage 25 where system programs are stored, loads the read system program to a work area of the RAM 23, and controls the units or the like of the portable terminal 2a in accordance with the loaded system program. The CPU 21 also reads a process program(s) from the storage 25 where process programs for various processes are stored, loads the read process program to the work area, and performs a process among the various processes in accordance with the loaded process program. The various processes include processes on the portable terminal 2a's side of the POP data creation process, the first obtainment process, and the second obtainment process, which will be described below.

The operation input unit 22 includes: push-button switches; and a touch sensor provided on the terminal display 24, and receives input operations from the user, converts the operation contents into electric signals, and outputs the electric signals to the CPU 21.

The terminal display 24 is constituted of an LCD, a CRT or the like, and displays screens in response to display control signals from the CPU 21. On the display screen of the terminal display 24, the touch sensor is provided. The terminal display 24 thus functions as a touchscreen-type operation display unit.

The storage 25 is constituted of an HDD having a magnetic storage medium, for example. The storage 25 stores: the system programs, the process programs, and the application programs, such as a Web browser, which are executed by the CPU 21; data necessary for execution of these programs; and so forth. The process programs include programs to perform various processes including the processes on the portable terminal 2a's side of the POP data creation process, the first obtainment process, and the second obtainment process, which will be described below.

The communication unit 26 communicates with external apparatuses on the communication network N, such as the server 4.

«Operation of Server 4»

[POP Data Creation Process]

Figure 8:
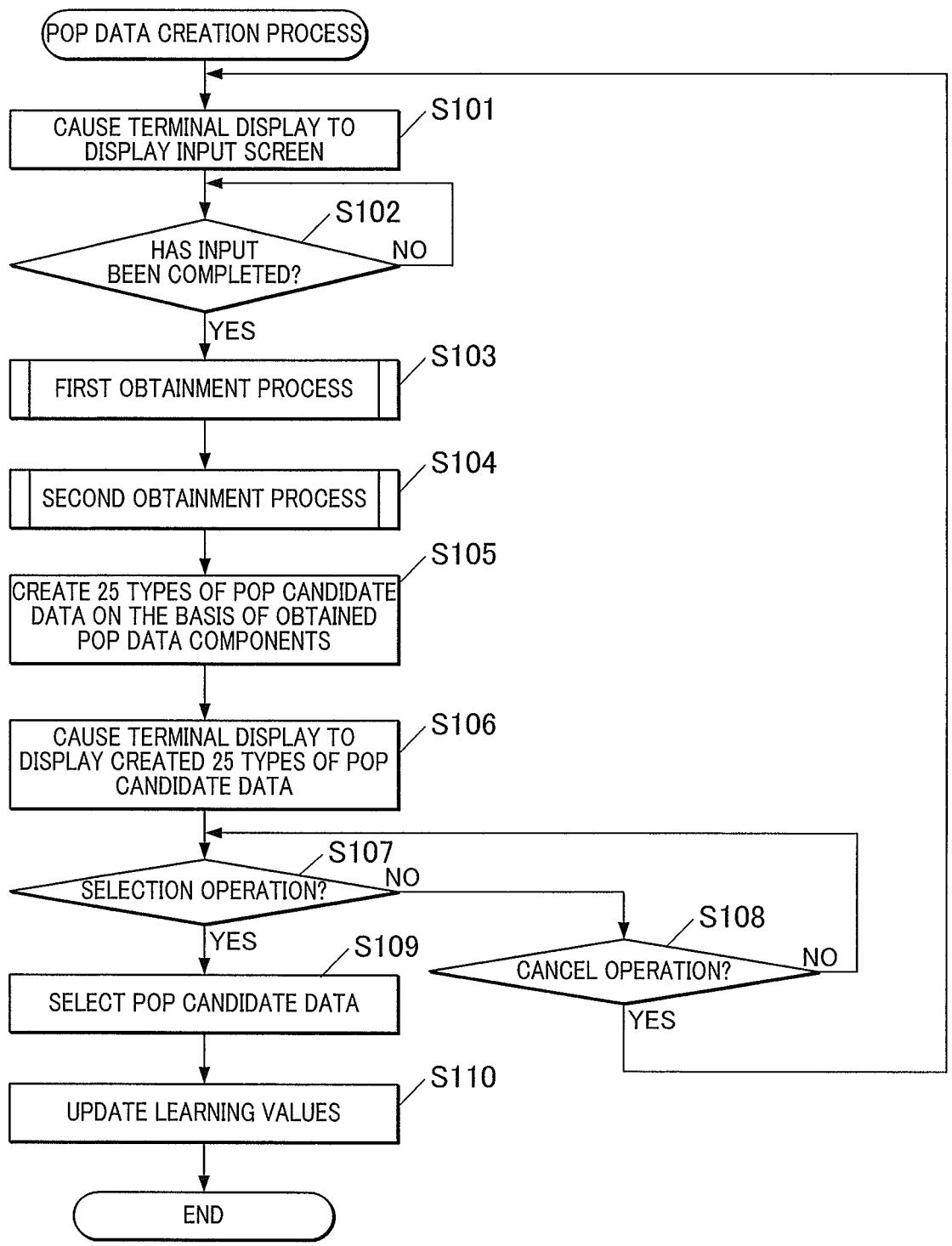
FIG. 8 is a flowchart showing an example of the POP data creation process performed by the server.
Figure 9:
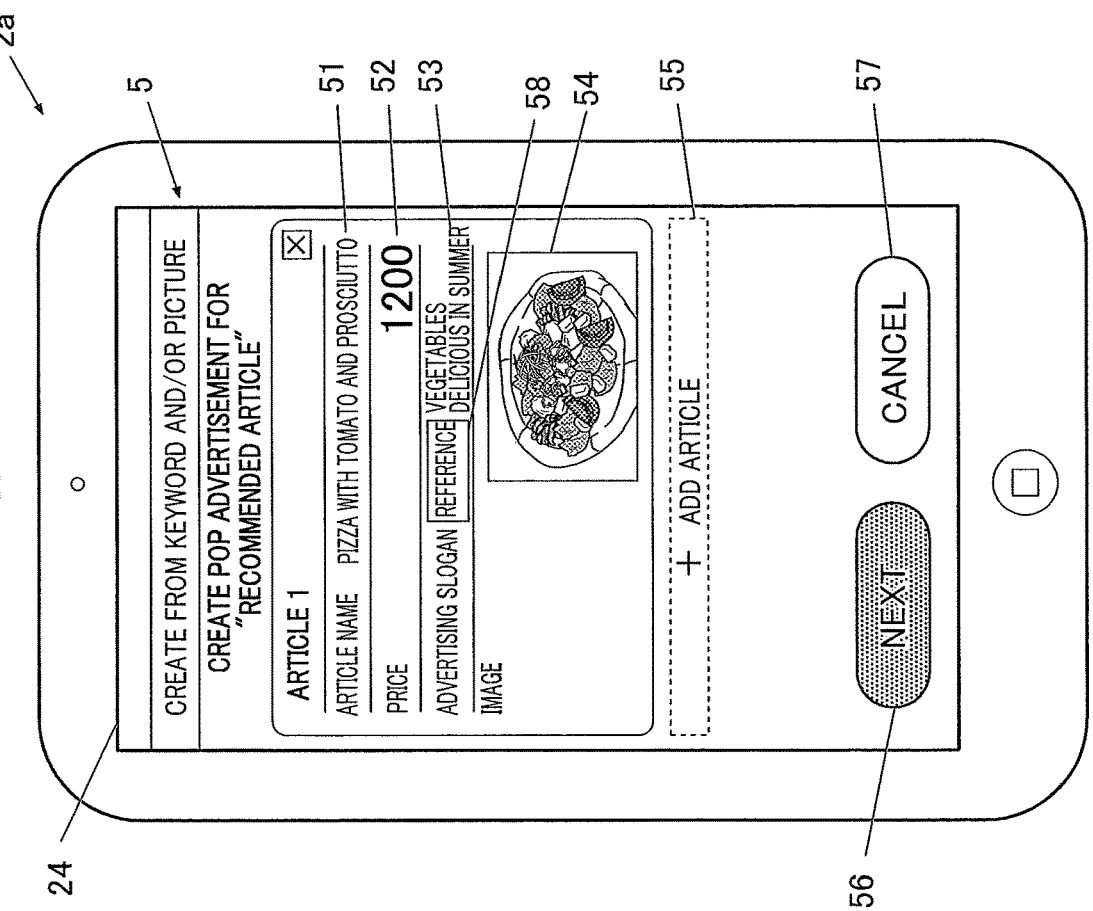
FIG. 9 shows an input screen as the first page before information input.
Figure 10:
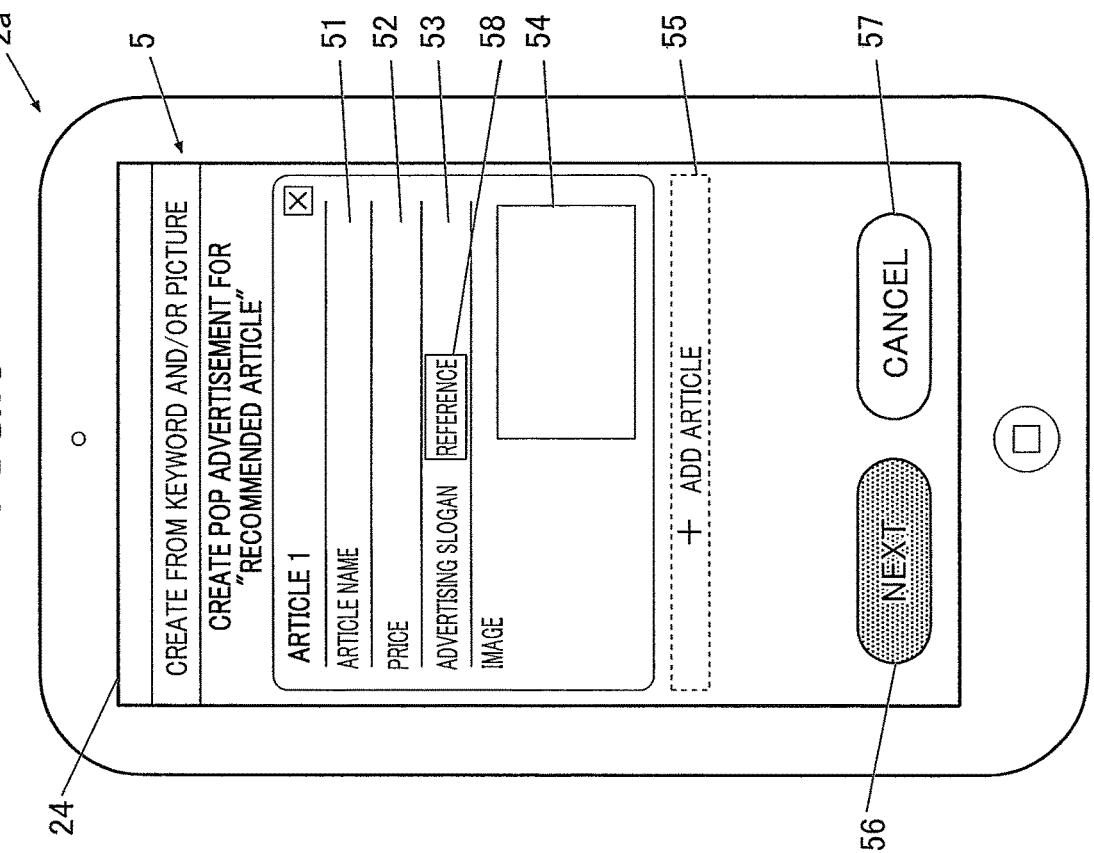
FIG. 10 shows the input screen as the first page after information input.
Figure 12:
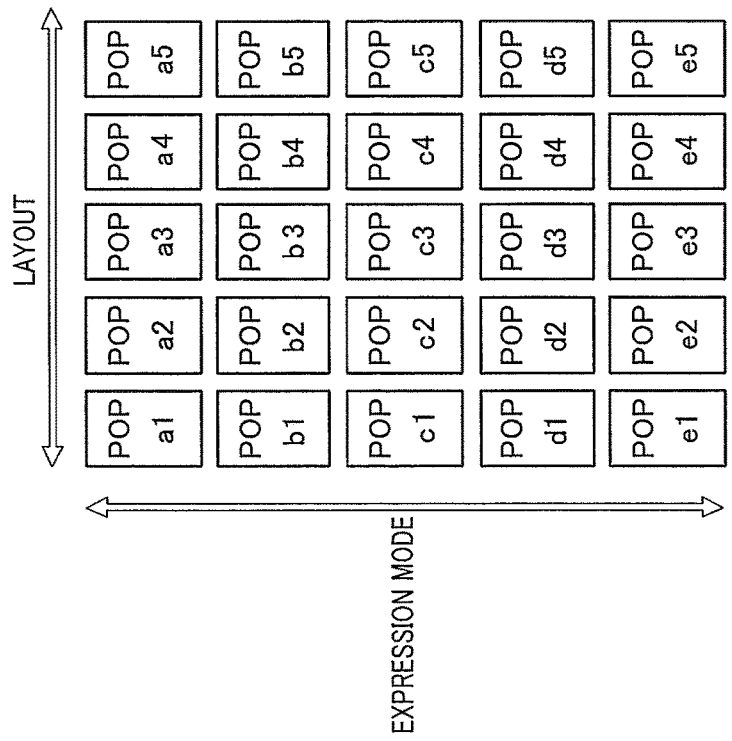
FIG. 12 shows examples of created 25 types of POP candidate data.
Figure 11:
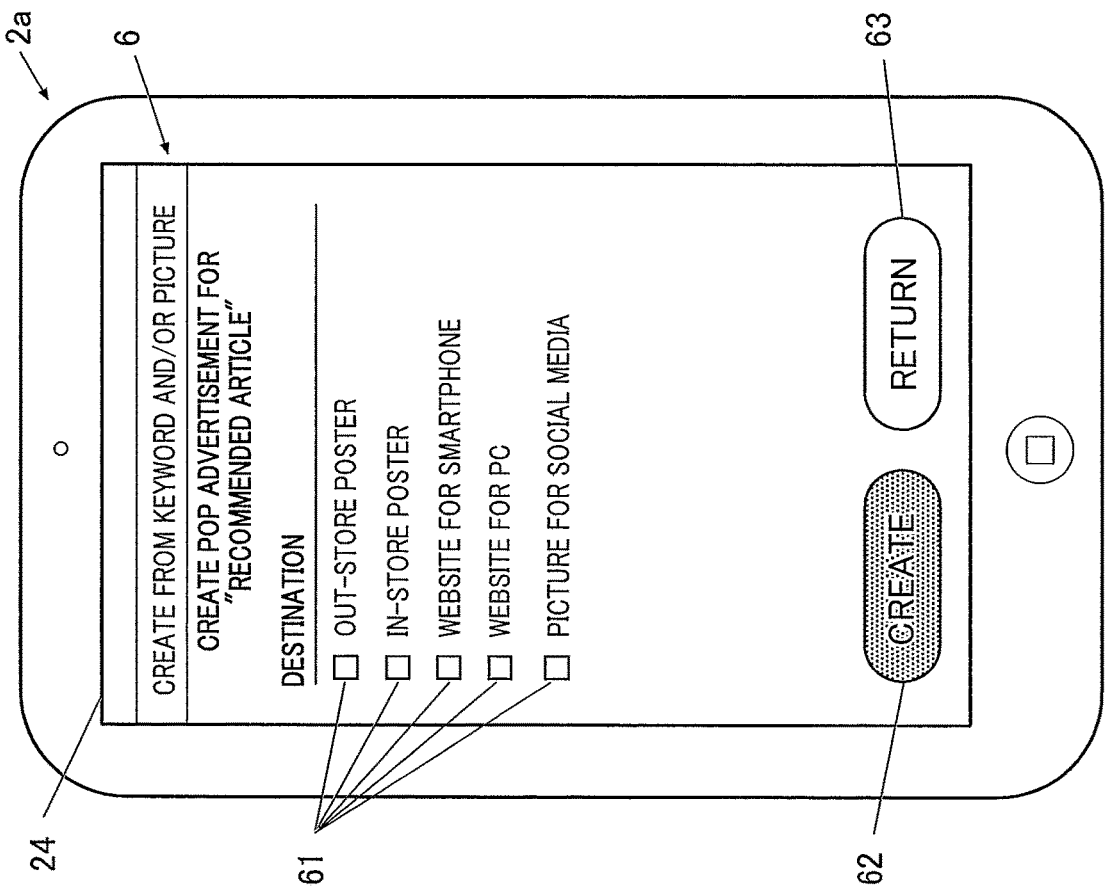
FIG. 11 shows an input screen as the second page before information input.

The POP data creation process performed by the server 4 of the embodiment will be described with reference to, for example, FIG. 8 to FIG. 16. FIG. 8 is a flowchart showing an example of the POP data creation process. FIG. 9 shows the input screen 5 as the first page before information input displayed on the terminal display 24. FIG. 10 shows the input screen 5 as the first page after information input displayed on the terminal display 24. FIG. 11 shows the input screen 6 as the second page before information input displayed on the terminal display 24. FIG. 12 shows examples of created 25 types of POP candidate data. FIG. 13 to FIG. 16 each show an example of one POP candidate data selected from 25 types of POP candidate data created for a POP's use.

The server 4 is configured to, when receiving text information and/or image data and a POP's use (destination) (which hereinafter may be collectively referred to as "input information"), perform the POP data creation process of outputting, in a form suitable for the use, POP data which introduces an article(s) of commerce (which hereinafter may be simply referred to as "article(s)") or a service(s).

More specifically, as shown in FIG. 8, in response to a request from a user terminal for execution of the program for POP data creation, the CPU 41 of the server 4 causes the terminal display 24 to display the input screen 5 as the first page shown in FIG. 9 (Step S101). The input screen 5 as the first page is a screen for the user of the user terminal to input predetermined input information to create POP data. The input information includes a name (article name) of an article (target article) to be introduced by POP data to be created, a price of the article, an advertising slogan for the article, and image data of the article. Among these, the article name and the advertising slogan are text information. The input screen 5 as the first page includes, as input sections to input the abovementioned information, an article name input section 51, a price input section 52, an advertising slogan input section 53, and an image data input section 54. For example, as shown in FIG. 10, in the article name input section 51, "pizza with tomato and prosciutto" is input, in the price input section 52, "1200" is input, in the advertising slogan input section 53, "vegetables delicious in summer" is input, and in the image data input section 54, image data of the pizza is input.

In addition to the input sections 51 to 54, the input screen 5 as the first page includes: an article adding button ("Add Article") 55 to be selected by the user to add, to POP data, another article to be introduced by the POP data; a go-to-next button ("Next") 56 to be selected by the user to go to the input screen 6 as the second page; a cancel button ("Cancel") 57 to be selected by the user to end display of the input screen 5; and a reference button ("Reference") 58 to be selected by the user to display information (e.g., examples of advertising slogans, words in fashion, etc.) serving as reference to input an advertising slogan.

When the user selects the article adding button 55 on the input screen 5 as the first page, one more article name input section 51, one more price input section 52, one more advertising slogan input section 53, and one more image data input section 54 are added to the input screen 5 as the first page. The user inputs information into each of the added input sections 51 to 54, so that the CPU 41 can create POP data which contains introductions of two types of articles. Thus, selecting the article adding button 55 multiple times and inputting information into each of the added input sections 51 to 54 allows the CPU 41 to create POP data which contains introductions of multiple types of articles.

Even if the user does not input information into all the input sections 51 to 54 on the input screen 5 as the first page, POP data can be created as far as at least one of the article name, the advertising slogan and the image data of one target article is input. However, more input information leads to higher accuracy of POP data to be created. Hence, it is preferable that information be input into all the input sections 51 to 54.

When the user selects the go-to-next button 56 on the input screen 5 as the first page, the CPU 41 causes the terminal display 24 to display the input screen 6 as the second page shown in FIG. 11. The input screen 6 as the second page is a screen for the user to input a POP's use (s) (destination (s)) to create POP data. The input screen 6 as the second page includes, as input sections to input POP's uses, five check boxes 61 which are associated with respective items "Out-store Poster", "In-store Poster", "Website for Smartphone", "Website for PC", and "Picture for Social Media". For example, to select the item "Website for PC", the user inputs a check mark into the check box 61 for the item.

In addition to the check boxes 61, the input screen 6 as the second page includes: a creation button ("Create") 62 to be selected by the user to create POP data after the abovementioned information is input; and a go-back button ("Return") 63 to be selected by the user to go back to the input screen 5 as the first page.

Next, as shown in FIG. 8, the CPU 41 determines whether or not input of information into the input sections 51 to 54 and input of information into the check boxes 61 have been completed (Step S102). More specifically, for example, the CPU 41 determines that the inputs have been completed when the user has input at least one of (i) the article name into the article name input section 51, (ii) the advertising slogan into the advertising slogan input section 53, and (iii) the image data into the image data input section 54, input a check mark into one of the check buttons 61, and selected the creation button 62.

When determining that the inputs have not been completed yet (Step S102; NO), the CPU 41 repeats Step S102. On the other hand, when determining that the inputs have been completed (Step S102; YES), on the basis of the information input into the image data input section 54 and the POP's use corresponding to the item associated with the check box 61 into which a check mark has been input, the CPU 41 performs the first obtainment process of selecting and thereby obtaining five types of the layout (i.e., five layout types) which are used to create POP data (Step S103). The first obtainment process will be detailed below.

Next, on the basis of the information input into the article name input section 51 and the advertising slogan input section 53, the CPU 41 performs the second obtainment process of selecting and thereby obtaining five types of each of the other POP data components (i.e., eye-catcher, font, font color, background, outline, and illustration) which are used to create POP data (Step S104). The second obtainment process will be detailed below.

Next, the CPU 41 creates 25 types of POP candidate data on the basis of the obtained POP data components (i.e., the POP-data-component types of each POP data component) (Step S105). That is, the CPU 41 first creates five types of expression mode (s) by combining the five types of each of the eye-catcher, the font, the font color, the background, the outline, and the illustration obtained in Step S104. The CPU 41 then combines the created five types of the expression mode, the five types of the layout obtained in Step S103, and the input information. The CPU 41 thus creates 25 types of POP candidate data. All the created 25 types of POP candidate data contain the input information.

Next, the CPU 41 causes the terminal display 24 to display the created 25 types of POP candidate data (Step S106). More specifically, the CPU 41 causes the terminal display 24 to display the preview screen (not shown) where one of the created 25 types of POP candidate data is displayed.

Each time the user performs a swipe operation on the preview screen, the CPU 41 causes the terminal display 24 to display another one of the 25 types of POP candidate data on the preview screen.

FIG. 12 shows POP candidate data a1 to a5, b1 to b5, c1 to c5, d1 to d5, and e1 to e5 as examples of the created 25 types of POP candidate data. The POP candidate data which line up horizontally in FIG. 12 have the same layout (i.e., the same layout type), and the POP candidate data which line up vertically in FIG. 12 have the same expression mode (i.e., the same expression-mode type). Each time the user performs a swipe operation horizontally or vertically, POP candidate data, in the arrangement shown in FIG. 12, horizontally or vertically adjacent to the POP candidate data displayed on (the preview screen of) the terminal display 24 is displayed thereon. Further, the POP candidate data in the arrangement shown in FIG. 12 are configured to be displayed in a looping manner both horizontally and vertically. For example, if a swipe operation from left to right (rightward) is input in a state in which the POP candidate data a1 is displayed on the terminal display 24, the POP candidate data a5 is displayed on the terminal display 24, whereas if a swipe operation from up to down (downward) is input in the state in which the POP candidate data a1 is displayed on the terminal display 24, the POP candidate data e1 is displayed on the terminal display 24.

Next, as shown in FIG. 8, the CPU 41 determines whether or not the user has input a selection operation to select desired POP candidate data (Step S107). More specifically, for example, if the user selects a selection button (not shown) in a state in which among the 25 types of POP candidate data, user's desired POP candidate data is displayed on the terminal display 24, the CPU 41 determines that the user has input a selection operation to select the POP candidate data.

When determining that the user has input no selection operation (Step S107; NO), the CPU 41 determines whether or not the user has input a cancel operation to end display of the preview screen (Step S108). More specifically, for example, if the user selects a cancel button (not shown), the CPU 41 determines that the user has input a cancel operation.

When determining that the user has input a cancel operation (Step S108; YES), the CPU 41 causes the terminal display 24 to end display of the preview screen, and returns to and repeats Step S101. On the other hand, when determining that the user has input no cancel operation (Step S108; NO), the CPU 41 returns to and repeats Step S107.

When determining in Step S107 that the user has input a selection operation (Step S107; YES), the CPU 41 selects, on the basis of the selection operation, one POP candidate data from the 25 types of POP candidate data created in Step S105 (Step S109).

Figure 13:
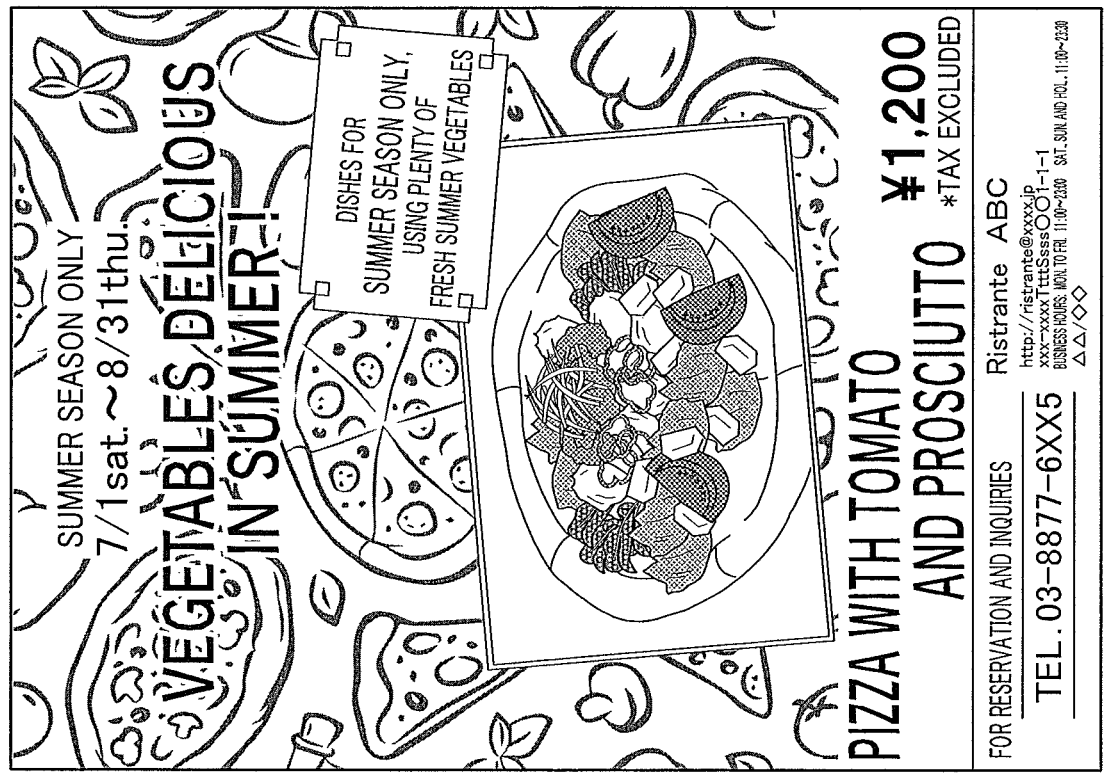
FIG. 13 shows an example of one POP candidate data selected from 25 types of POP candidate data created for a POP's use "Out-store Poster" or a POP's use "Picture for Social Media"

FIG. 13 shows an example of the one POP candidate data selected from the 25 types of POP candidate data created for the POP's use "Out-store Poster" or the POP's use "Picture for Social Media".

As shown in FIG. 13, in the POP candidate data created for the POP's use "Out-store Poster" or the POP's use "Picture for Social Media", letters of the article name "Pizza with Tomato and Prosciutto", the price "¥1,200", and the advertising slogan "Vegetables Delicious in Summer" are displayed largely because for the use, "0.6 or more", which is relatively large, is set as the condition in the item "Font Size" in the components-selecting-purpose condition data table 453. In the POP candidate data, an eye-catcher "Dishes for Summer Season Only, Using Plenty of Fresh Summer Vegetables" is displayed. Further, the POP candidate data created for the POP's use "Out-store Poster" is displayed with 300 dpi because for the use, "300 dpi" is set in the item "Resolution of Output Image" in the components-selecting-purpose condition data table 453, whereas the POP candidate data created for the POP's use "Picture for Social Media" is displayed with 150 dpi because for the use, "150 dpi" is set in the item "Resolution of Output Image" in the components-selecting-purpose condition data table 453.

Figure 14:
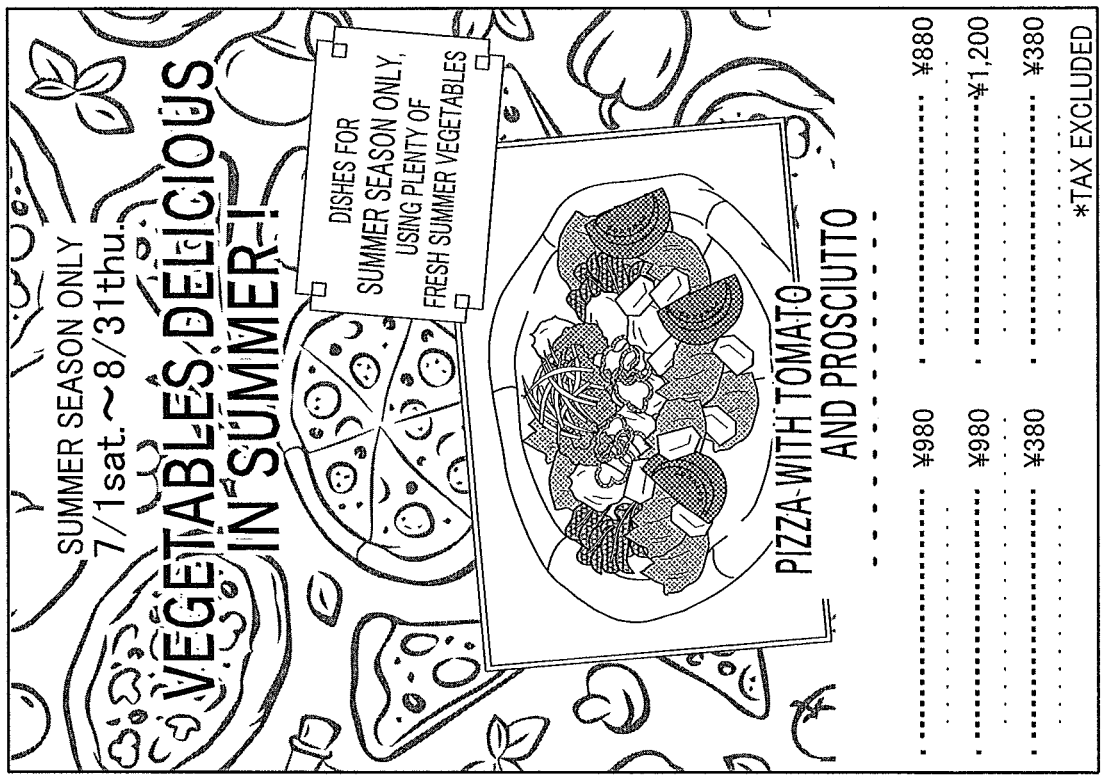
FIG. 14 shows an example of one POP candidate data selected from 25 types of POP candidate data created for a POP's use "In-store Poster"

FIG. 14 shows an example of the one POP candidate data selected from the 25 types of POP candidate data created for the POP's use "In-store Poster".

As shown in FIG. 14, the POP candidate data created for the POP's use "In-store Poster" has the layout in which the letters of the article name "Pizza with Tomato and Prosciutto" and the price "¥1,200" are not displayed largely because for the use, unlike the POP candidate data created for the POP's use "Out-store Poster", "Any" is set as the condition in the item "Font Size" in the components-selecting-purpose condition data table 453. Further, the POP candidate data created for the POP's use "In-store Poster" is displayed with 300 dpi because for the use, "300 dpi" is set in the item "Resolution of Output Image" in the components-selecting-purpose condition data table 453.

Figure 15:
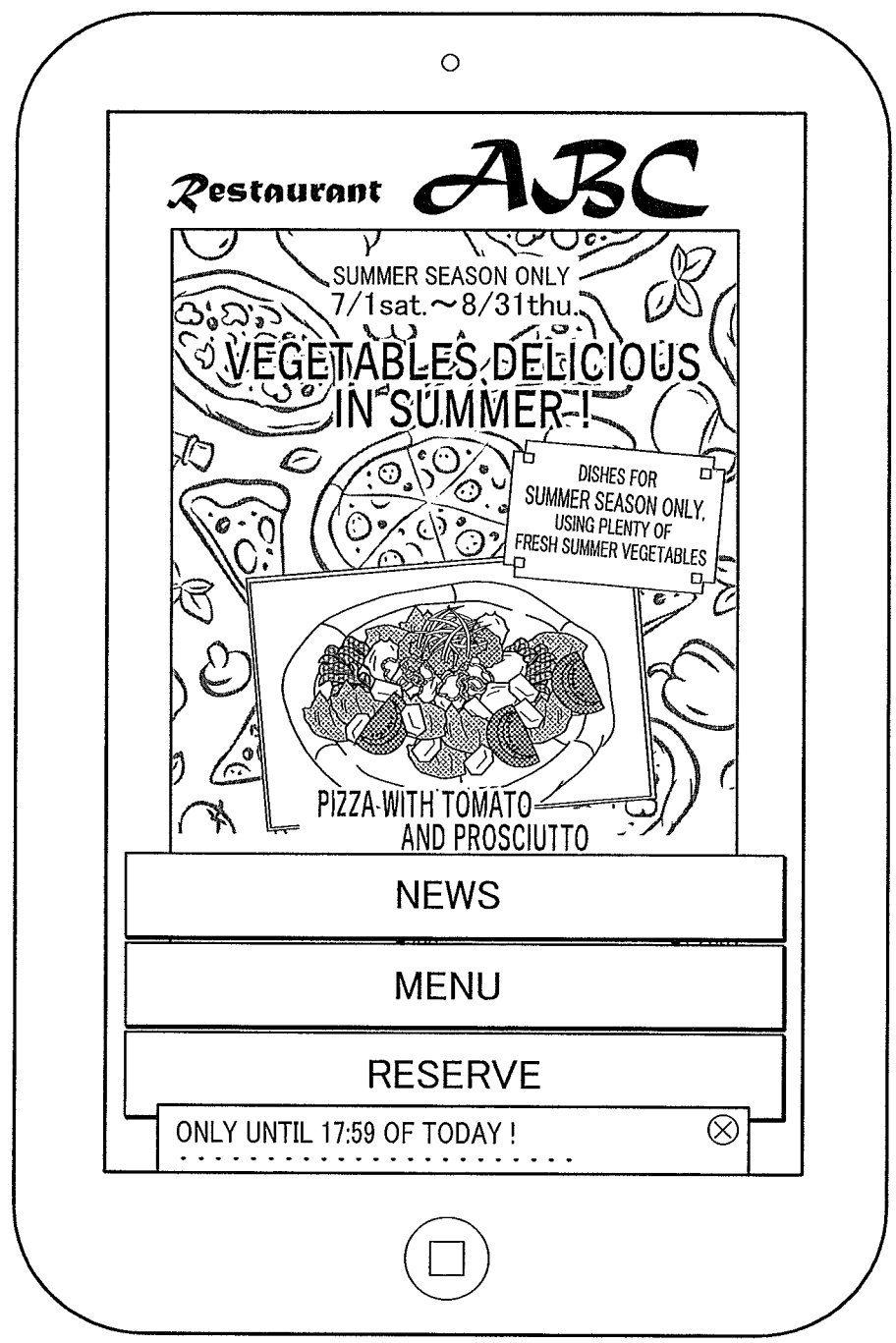
FIG. 15 shows an example of one POP candidate data selected from 25 types of POP candidate data created for a POP's use "Website for Smartphone"

FIG. 15 shows an example of the one POP candidate data selected from the 25 types of POP candidate data created for the POP's use "Website for Smartphone". FIG. 15 shows the POP candidate data in a state of being output on a website for smartphones.

As shown in FIG. 15, the POP candidate data created for the POP's use "Website for Smartphone" fits the POP output region on the website for smartphones because for the use, "Fitting" is set as the condition in the item "Fitting into Layout of Website" in the components-selecting-purpose condition data table 453. Further, the POP candidate data created for the POP's use "Website for Smartphone" is displayed with 150 dpi because for the use, "150 dpi" is set in the item "Resolution of Output Image" in the components-selecting-purpose condition data table 453.

Figure 16:
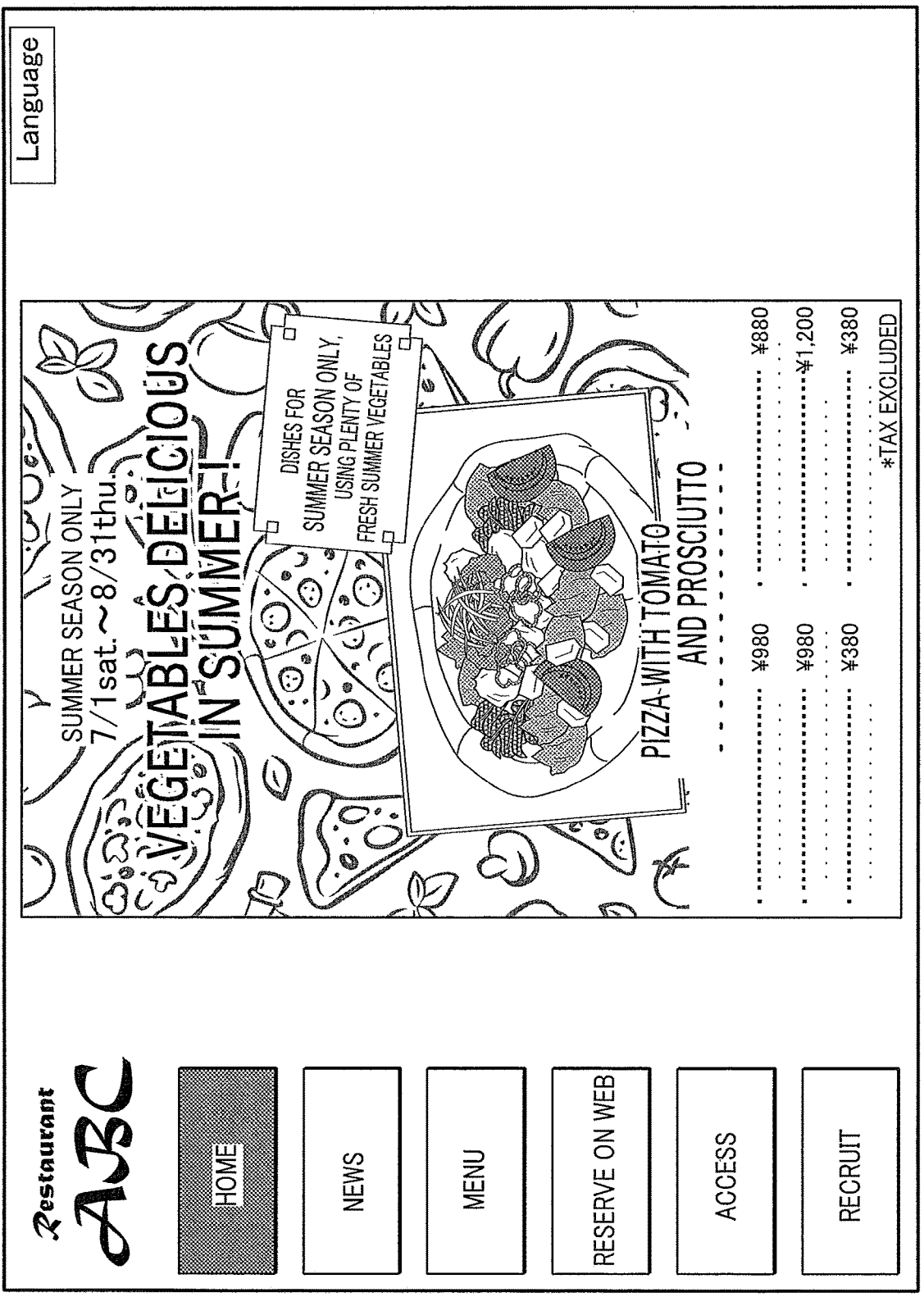
FIG. 16 shows an example of one POP candidate data selected from 25 types of POP candidate data created for a POP's use "Website for PC"

FIG. 16 shows an example of the one POP candidate data selected from the 25 types of POP candidate data created for the POP's use "Website for PC". FIG. 16 shows the POP candidate data in a state of being output on a website for PCs.

As shown in FIG. 16, the POP candidate data created for the POP's use "Website for PC" fits the POP output region on the website for PCs because for the use, "Fitting" is set as the condition in the item "Fitting into Layout of Website" in the components-selecting-purpose condition data table 453. Further, the POP candidate data created for the POP's use "Website for PC" is displayed with 150 dpi because for the use, "150 dpi" is set in the item "Resolution of Output Image" in the components-selecting-purpose condition data table 453.

Next, the CPU 41 updates the learning values on the basis of the selection result in Step S109 (Step S110). More specifically, on the basis of (i) the learning values calculated at the time of the last POP data creation (FIG. 6), (ii) how many times POP data has been created except this time (the number of times of POP creation, which may be simply referred to as "POP creation times"), and (iii) the selection result in Step S109, the CPU 41 calculates learning values for the respective items with the following formula (1), and updates the learning values stored in the learning value data table 454 with the calculated learning values. The CPU 41 calculates the learning values with the following formula (1) for all the items in the learning value data table 454 shown in FIG. 6.

Learning Value=(Learning Value Calculated Last Time for User×POP Creation Times+Index Value of POP Data Component Contained in Selected POP Candidate Data)/(POP Creation Times +1)     <Formula (1)>

For example, if the POP creation times of POP data created for the POP's use "Out-store Poster" are 19 times, the layout contained in the POP candidate data selected in Step S109 is the layout type L1, and the user code of the user is "000001", learning values for the item "Portrait/Landscape" and the item "Picture Size" of the layout are calculated as follows.

Learning Value for "Portrait/Landscape"=(0.3×19+1)/(19+1)=0.335

Learning Value for "Picture Size"=(0.6×19+1.0)/(19+1)=0.62

The POP data creation process is thus performed.

After the POP data creation process, the CPU 41 may cause the storage 45 to store the POP candidate data selected in Step S109 as the finished version. Alternatively, in response to a user's predetermined operation, the CPU 41 may cause the terminal display 24 to display an edit screen (not shown) for the user to edit the POP candidate data. Consequently, the CPU 41 can modify the POP data components contained in the POP candidate data as the user desires, and cause the storage 45 to store, as the finished version, the modified POP candidate data which is far closer to the user's preference. Further, in response to a request from the user terminal for execution of printing of the finished-version POP data, the CPU 41 may output the POP data to the printer 11 via the communication unit 46 to cause the printer 11 to print the POP data.

In the above, in Step S105, 25 types of POP candidate data are created from five types of the layout and five types of the expression mode. However, this is not intended to limit the present invention. For example, the number of layouts (i.e., layout types) and the number of expression modes (i.e., expression-mode types) which are used to create POP candidate data may be any numbers, and also how to combine these is not limited. Further, for example, the number of types of POP candidate data to be created may be 24 or less, or 26 or more.

[First Obtainment Process]

Figure 17:
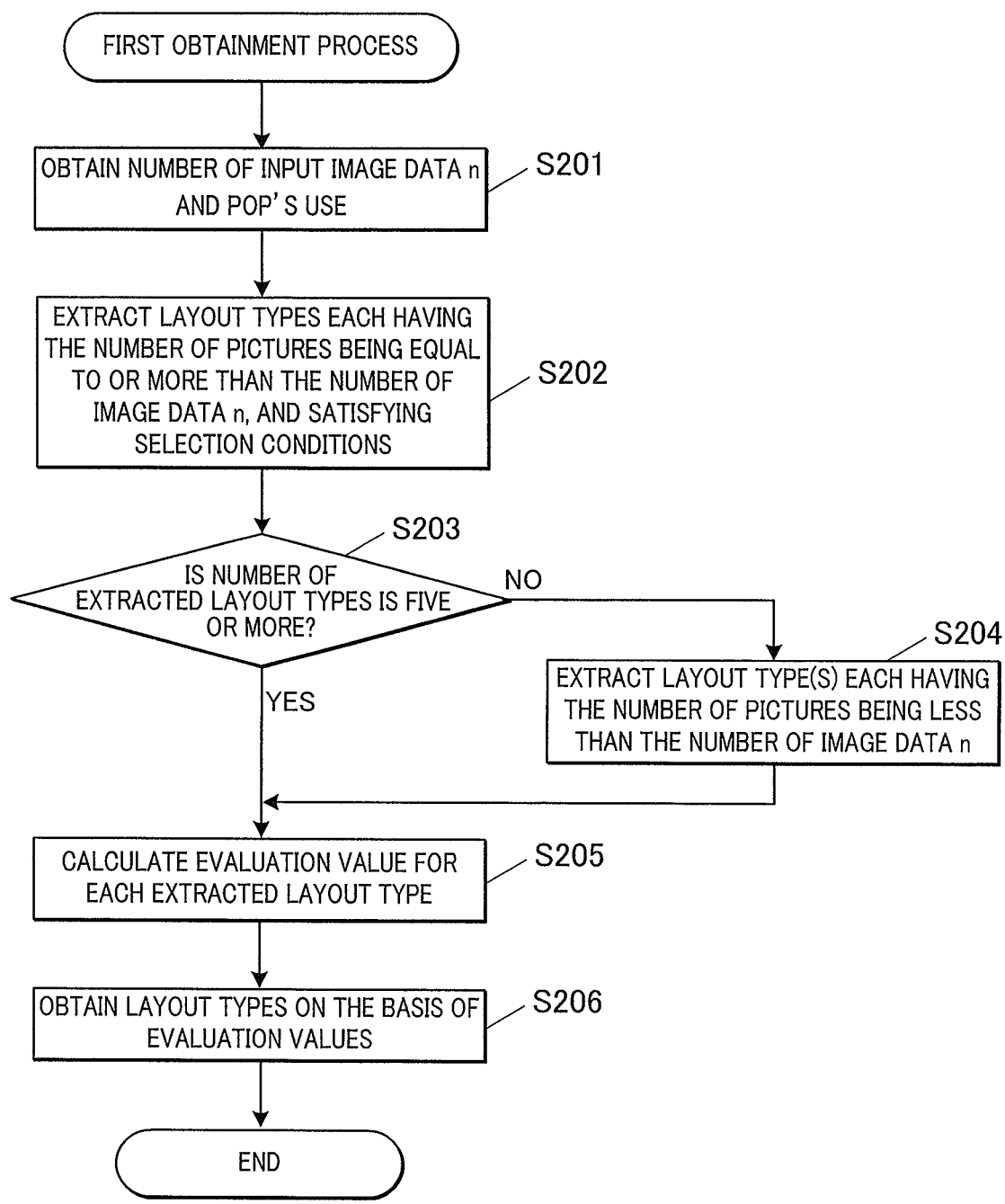
FIG. 17 is a flowchart showing an example of a first obtainment process performed by the server.

The first obtainment process performed by the server 4 of the embodiment will be described with reference to FIG. 17 and so forth. FIG. 17 is a flowchart showing an example of the first obtainment process.

As shown in FIG. 17, the CPU 41 first obtains (i) the number of image data n input by the user into the image data input section 54 on the input screen 5 as the first page, and (ii) the POP's use (destination) corresponding to, on the input screen 6 as the second page, the check box 61 into which the user has input a check mark (Step S201). For example, if no image data is input in the image data input section 54 on the input screen 5 as the first page, the number of image data n=0, whereas if image data is input in the image data input section 54 on the input screen 5 as the first page, the number of image data n=1. Further, for example, if image data are input in two image data input sections 54, one of which is added by the article adding button 55 being selected once, the number of image data n=2.

Next, referring to the layout data table 451 shown in FIG. 3 and the components-selecting-purpose condition data table 453 shown in FIG. 5, the CPU 41 extracts, from the layout types L1 to L40, layouts (i.e., layout types) each having the "Number of Pictures" being equal to or more than the number of image data n obtained in Step S201, and satisfying the components-selecting-purpose conditions for the POP's use obtained in Step S201 (Step S202). For example, if the number of image data n obtained in Step S201 is 1, and the POP's use obtained Step S201 is the "Website for PC", the CPU 41 extracts the layout types L1, L2, L3 and so forth, each of which has "1" or more as the index value for the "Number of Pictures", and satisfies the components-selecting-purpose conditions (Fitting into Layout of Website; Fitting, and Font Size; 0.6 or more) for the "Website for PC".

Next, as shown in FIG. 17, the CPU 41 determines whether or not the number of the extracted layout types is five or more (Step S203). When determining that the number of the extracted layout types is not five or more (Step S203; NO), the CPU 41 additionally extracts a layout type (s) each having the "Number of Pictures" being less than the number of image data n (Step S204), and proceeds to Step S205.

On the other hand, when determining that the number of the extracted layout types is five or more (Step S203; YES), the CPU 41 calculates, for each extracted layout type, an evaluation value (Step S205). More specifically, for example, the CPU 41 calculates, for each extracted layout type, an evaluation value with the following formula (2) on the basis of the index values set for the respective items about the layout type (FIG. 3) and the learning values associated with the user (FIG. 6).

Evaluation Value=Index Value for "Portrait/Landscape" of Extracted Layout×Learning Value for "Portrait/Landscape" under Layout for Obtained Use of User+Index Value for "Picture Size" of Extracted Layout×Learning Value for "Picture Size" under Layout for Obtained Use of User+ Index Value for "Eye-catcher Size" of Extracted Layout x Learning Value for "Eye-catcher Size" under Layout for Obtained Use of User     <Formula (2)>

For example, if a layout type extracted in Step S202 or Step S204 is the layout type L3, the user code of the user is "000001", and the obtained use is "Website for PC", the evaluation value of the layout type L3 is calculated as follows.

Evaluation Value of Layout Type L3=0×0.1+0.9×0.4+0.3×0.6=0.54

Next, as shown in FIG. 17, the CPU 41 obtains layouts (i.e., layout types) from the storage 45 on the basis of the evaluation values (Step S206). More specifically, for example, the CPU 41 ranks the layout types extracted in Step S202 and/or Step S204 in descending order of the evaluation values calculated in Step S205. Then, the CPU 41 obtains two highest-ranked layout types, two median-ranked layout types, and one lowest-ranked layout type from the storage 45. For example, if the CPU 41 extracts all the 40 layout types in Step S202 and/or Step S204, the CPU 41 obtains the $1^{st}$, $2^{nd}$, $20^{th}$, $21^{st}$ and $40^{th}$ layout types in the ranking of the evaluation values.

The first obtainment process is thus performed.

In the above, in Step S205, evaluation values are calculated on the basis of the items "Portrait/Landscape", "Picture Size" and "Eye-catcher Size" only. However, this is not intended to limit the present invention. For example, evaluation values may be calculated on the basis of any combination of items as far as the items are shared by the index values which are associated with each layout type and the learning values which are associated with each user.

Further, in the above, in Step S206, two highest-ranked layout types, two median-ranked layout types, and one lowest-ranked layout type are obtained. However, this is not intended to limit the present invention. For example, any ranked layout type and any number of layout types may be obtained as far as the obtained layout types include a highly ranked layout type.

[Second Obtainment Process]

Figure 18:
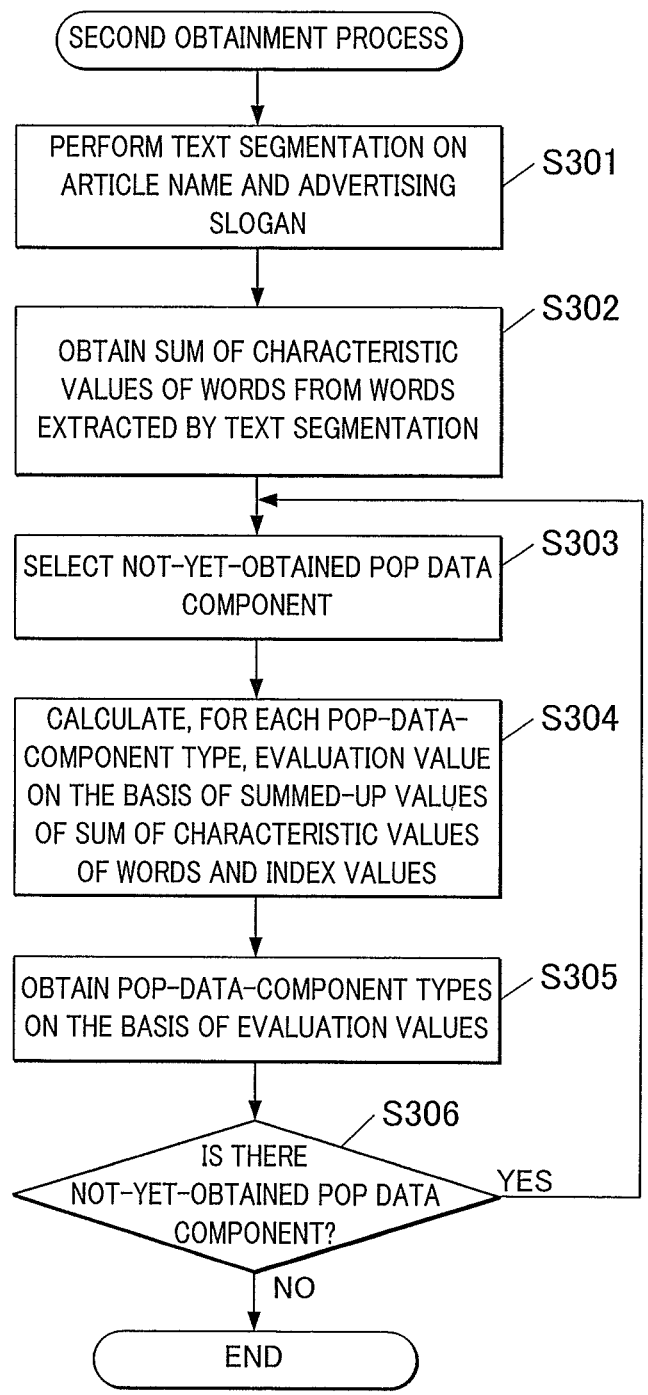
FIG. 18 is a flowchart showing an example of a second obtainment process performed by the server.

The second obtainment process performed by the server 4 of the embodiment will be described with reference to FIG. 18, FIG. 19 and so forth. FIG. 18 is a flowchart showing an example of the second obtainment process. FIG. 19 shows an example of, for each item, the sum of characteristic values of words obtained on the basis of the information input by the user into the article name input section 51 and the advertising slogan input section 53.

First, as shown in FIG. 18, the CPU 41 performs text segmentation on the article name input in the article name input section 51 and the advertising slogan input in the advertising slogan input section 53, thereby extracting words contained in the texts (Step S301). For example, if "pizza with tomato and prosciutto" is input in the article name input section 51 as shown in FIG. 10, the CPU 41 performs text segmentation thereon, thereby extracting words "pizza", "with", "tomato", "and" and "prosciutto". Further, if "vegetables delicious in summer" is input in the advertising slogan input section 53 as shown in FIG. 10, the CPU 41 performs text segmentation thereon, thereby extracting words "vegetables", "delicious", "in" and "summer".

If no information is input in either the article name input section 51 or the advertising slogan input section 53, but image data of the target article is input in the image data input section 54, the CPU 41 may perform image analysis on the input image data, thereby identifying the name (word(s)) of the article indicated by the image data. For example, if image data of a pizza is input in the image data input section 54 as shown in FIG. 10, the CPU 41 may perform image analysis thereon, thereby identifying a word "pizza" as the name of the article indicated by the image data.

Next, as shown in FIG. 18, the CPU 41 obtains sums of words' characteristic values from the words extracted by the text segmentation (or word(s) identified by the image analysis) (Step S302). More specifically, for example, as shown in FIG. 19, the CPU 41 obtains, from the storage 45, the characteristic values set in advance for the words "pizza", "with", "tomato", "and", and "prosciutto" extracted from the article name "pizza with tomato and prosciutto" input in the article name input section 51 and the words "vegetables", "delicious", "in" and "summer" extracted from the advertising slogan "vegetables delicious in summer" input in the advertising slogan input section 53. As described above, in the storage 45, the characteristic values are set for the abovementioned respective items, and associated and stored with each word, in advance.

The CPU 41 sums up, for each item, the characteristic values set for the respective words, thereby obtaining, for each item, the sum of words' characteristic values. It should be noted that, about the item "Portrait/Landscape", as the sum of words' characteristic values, the summed-up value of the characteristic values is divided by the total number of the words (or their parts of speech, which are nouns, adverbs, verbs, adjectives, prepositions, conjunctions, and so forth). For example, in the case shown FIG. 19, the summed-up value of the characteristic values for the item "Portrait/Landscape" is 6, and the total number of the words (or their parts of speech, which are nouns, adverbs, verbs, adjectives, prepositions, conjunctions, and so forth) is 9, so that 6/9=0.667 is obtained as the sum of words' characteristic values for the item "Portrait/Landscape".

Next, as shown in FIG. 18, the CPU 41 selects one not-yet-obtained POP data component from the POP data components which are the eye-catcher, the font, the font color, the background, the outline, and the illustration (Step S303). Hereinafter, a case where the CPU 41 selects the eye-catcher from the POP data components will be described.

Next, the CPU 41 calculates, for each eye-catcher type, an evaluation value with the following formula (3) on the basis of the sums of words' characteristic values (FIG. 19) obtained in Step S302 and the index values set for the respective items about the eye-catcher type (FIG. 4) (Step S304). In the embodiment, the CPU 41 calculates evaluation values for all the eye-catcher types (i.e., eye-catchers) stored in the storage 45.

Evaluation Value=Index Value for "Portrait/Landscape" of Eye-catcher×Sum of Words' Characteristic Values for "Portrait/Landscape"+Index Value for "for Japanese Food" of Eye-catcher×Sum of Words' Characteristic Values for "for Japanese Food"+Index Value for "for Western Food" of Eye-catcher×Sum of Words' Characteristic Values for "for Western Food"+Index Value for "for Cafe" of Eye-catcher×Sum of Words'Characteristic Values for "for Cafe"+Index Value for "for Chinese Food" of Eye-catcher×Sum of Words' Characteristic Values for "for Chinese Food"   <Formula (3)>

For example, if the user code of the user is "000001", the evaluation value of the eye-catcher type i1 is calculated as follows.

Evaluation Value of Eye-catcher Type $i1$=0×0.667+ 1×4+1×6+1×2+0×3=12

Further, for example, if the user code of the user is "000001", the evaluation value of the eye-catcher type i2 is calculated as follows.

Evaluation Value of Eye-catcher Type $i2$=0×0.667+ 1×4+0×6+1×2+1×3=9

Next, as shown in FIG. 18, the CPU 41 obtains eye-catchers (i.e., eye-catcher types) from the storage 45 on the basis of the evaluation values (Step S305). More specifically, for example, the CPU 41 ranks the eye-catcher types in descending order of the evaluation values calculated in Step S304. Then, the CPU 41 obtains two highest-ranked eye-catcher types, two median-ranked eye-catcher types, and one lowest-ranked eye-catcher type from the storage 45. Because 40 eye-catcher types are stored in the storage 45, the CPU 41 obtains the $1^{st}$, $2^{nd}$, $20^{th}$, $21^{st}$ and $40^{th}$ eye-catcher types in the ranking of the evaluation values.

Next, the CPU 41 determines whether or not there is a not-yet-obtained POP data component among the POP data components which are the eye-catcher, the font, the font color, the background, the outline, and the illustration (Step S306). When determining that there is a not-yet-obtained POP data component (Step S306; YES), the CPU 41 returns to and repeats Step S303. On the other hand, when determining that there is no not-yet-obtained POP data component (Step S306; NO), the CPU 41 ends the second obtainment process.

The second obtainment process is thus performed.

In the above, in Step S302, the sums of words' characteristic values are calculated on the basis of the information input in the article name input section 51 and the advertising slogan input section 53. However, this is not intended to limit the present invention. For example, the CPU 41 may calculate the sums of words' characteristic values on the basis of, in addition to the above, the abovementioned type of business and/or type of operation about the user, the type of business and/or the type of operation being stored as the user information in the storage 45, and/or the current season, event and/or the like identified by the timer 47. In this case, in the storage 45, the characteristic values are set for the abovementioned respective items, and associated and stored with each of the type of business, type of operation, season, event and so forth, in advance. For example, about a type of business and/or a type of operation "Chinese Restaurant", in the item "for Chinese Food", "1" may be set as its characteristic value, and this characteristic value "1" may be added to calculate the sum of words' characteristic values. Further, for example, about a season and/or an event "Christmas", in the item "for Western Food", "1" may be set as its characteristic value, and this characteristic value "1" may be added to calculate the sum of words' characteristic values.

Further, in the above, in Step S302, each of the words extracted from the article name and the advertising slogan is associated and stored with the characteristic values for the abovementioned respective items in the storage 45. However, this is not intended to limit the present invention. For example, if a word extracted from the article name or the advertising slogan is not associated or stored with any characteristic value in the storage 45, "0" may be set as its characteristic values for all the items, and also a part of speech of the word may not be identified.

In the above, in Step S304, evaluation values are calculated on the basis of the items "Portrait/Landscape", "for Japanese Food", "for Western Food", "for Cafe" and "for Chinese Food" only. However, this is not intended to limit the present invention. For example, evaluation values may be calculated on the basis of any combination of items as far as the items are shared by the sums of words' characteristic values and the index values which are associated with each eye-catcher type.

Further, in the above, in Step S305, two highest-ranked POP-data-component types, two median-ranked POP-data-component types, and one lowest-ranked POP-data-component type are obtained. However, this is not intended to limit the present invention. For example, any ranked POP-data-component type and any number of POP-data-component types may be obtained as far as the obtained POP-data-component types include a highly ranked POP-data-component type.

«Technical Effects of Embodiment(s)»

According to the embodiment, the server 4 selects a layout as a first POP data component of POP data on the basis of a POP's use input by a user, extracts word(s) by performing text segmentation on text information input by the user, selects a second POP data component different from the layout on the basis of the extracted words, and creates POP candidate data by combining the selected layout and the selected second POP data component, which is different from the layout. Consequently, the server 4 can create diverse POP data with simpler input operations, which are input of a POP's use and input of text information, in the form suitable for the use of the POP data.

Further, according to the embodiment, the server 4 can create POP data in the form suitable for each one of various uses which include an out-store poster, an in-store poster, a website for smartphones, a website for personal computers, and a picture for social media.

Further, according to the embodiment, the server 4 derives evaluation values for respective layout candidates each of which satisfies predetermined condition(s) for the POP's use, and selects the layout on the basis of the derived evaluation values. Consequently, the server 4 can create POP data suitable for its use with high accuracy.

Further, according to the embodiment, the server 4 extracts the layout candidates on the basis of the quantity of image data input by the user. Consequently, the server 4 can create POP data having a higher degree of design.

Further, according to the embodiment, the text information is one or both of: a name of an article of commerce or a service which is a target of the POP (advertisement); and an advertising slogan. Consequently, the server 4 can create POP data with far simpler input operations.

Further, according to the embodiment, the server 4 derives, from the extracted words, evaluation values for respective second POP-data-component candidates, and selects the second POP data component on the basis of the derived evaluation values. Consequently, the server 4 can select each second POP data component (i.e., eye-catcher, font, font color, background, outline, and illustration) suitable for the contents of the input information, and accordingly can create POP data suitable for the input contents.

«Others»

The above embodiment is merely one of preferred examples of the advertisement management apparatus of the present invention, and is not intended to limit the present invention.

For example, in the above embodiment, the server 4 causes the storage 45 to store the various data, and causes the terminal display 24 to display the various screens. However, these are not intended to limit the present invention. For example, the server 4 may cause the storage 45 to store the various data, and cause the server display 44 to display the various screens. Alternatively or additionally, the portable terminal 2a may cause the storage 25 to store the various data, and cause the terminal display 24 to display the various screens. In this case, the portable terminal 2a functions as the advertisement management apparatus.

Further, in the above embodiment, the advertisement management system 1 includes the printer 11 which connects with other apparatuses via the communication network N. However, this is not intended to limit the present invention. For example, the advertisement management system 1 may not include the printer 11, or the printer 11 may connect with the user terminal(s) via a communication cable, such as a universal serial bus (USB) cable.

Further, in the above embodiment, as the POP's use, the out-store poster, the in-store poster, the website for smartphones, the website for PCs, and the picture for social media are cited. However, these are not intended to limit the present invention. For example, the POP's use may be, what is called, a leaflet to inform opening of a new store, or to inform holding of an event, such as a sale. In this case, examples of the input information input by the user on the input screen 5 include date(s), article names, prices, comments, and image data.

Further, in the above embodiment, created multiple types of POP candidate data are displayed on the preview screen (not shown) one by one in order. However, this is not intended to limit the present invention. For example, created multiple types of POP candidate data may be displayed two or more at a time in order, or may be displayed in the form of a list.

Further, in the above embodiment, the learning values are derived for the respective items of each POP data component. However, this is not intended to limit the present invention. For example, the learning values may be derived for each POP-data-component type. For example, the learning values may be derived for each of the layout types L1, L2, . . . and L40, and for each of the eye-catcher types i1, i2, . . . and i40. About the other POP data components which are the font, the font color, the background, the outline, and the illustration, the learning values may be derived similarly.

Further, in the above embodiment, the learning value are calculated with the above formula (1). However, this is not intended to limit the present invention. The learning values may be calculated with any condition as far as the learning values are calculated on the basis of the result of selection of POP candidate data by the user. For example, points may be given to the POP data components contained in the POP candidate data selected by the user, and the summed-up values of the points given so far may be calculated as the learning values. Further, for example, the learning values may be calculated by taking time from Step S106, in which 25 types of POP candidate data are displayed, to Step S109, in which one of these is selected, into account.

Further, in the above embodiment, the learning values are calculated, and the learning value data table 454 is updated therewith. However, this is not intended to limit the present invention. For example, the learning values may not be calculated, or the learning value data table 454 may not be stored in the storage 45. In this case, in the first obtainment process, no learning value may be used for calculation of the evaluation values of the layout types. For example, as with the second obtainment process, the evaluation values of the layout types may be calculated on the basis of the words extracted by text segmentation on the input text information. Meanwhile, in the second obtainment process, the learning values may be used for calculation of the evaluation values.

Further, in the above embodiment, in the first obtainment process and the second obtainment process, the CPU 41 obtains some specific POP-data-component types of each POP data component from all the POP-data-component types thereof stored in the storage 45 on the basis of the evaluation values. However, this is not intended to limit the present invention. For example, the CPU 41 may, in advance, extract some POP-data-component types of each POP data component from all the POP-data-component types thereof stored in the storage 45 on the basis of the user information and/or the current season, event or the like identified by the timer 47, and then, in the first obtainment process and the second obtainment process, may obtain some specific POP-data-component types of each POP data component from the extracted POP-data-component types thereof on the basis of their evaluation values. For example, if the user information indicates the type of business and/or the type of operation "Chinese Restaurant", the CPU 41 may, in advance, extract POP-data-component types having "1" as their characteristic values for the item "for Chinese Food", and then, in the first obtainment process and the second obtainment process, may obtain some specific POP-data-component types from the extracted POP-data-component types on the basis of their evaluation values.

Alternatively or additionally, for example, the CPU 41 may, in advance, extract some POP-data-component types from all the POP-data-component types stored in the storage 45 on the basis of user's operation inputs, and then, in the first obtainment process and the second obtainment process, may obtain some specific POP-data-component types from the extracted POP-data-component types on the basis of their evaluation values.

Further, in the above embodiment, in the second obtainment process, five types of each of the POP data components which are the eye-catcher, the font, the font color, the background, the outline, and the illustration are selected. However, this is not intended to limit the present invention. For example, among the above POP data components, one or more of the font, the font color, the background, the outline and the illustration may not be selected, and/or about one or more of these, a predetermined type(s) may be set in advance.

In the above embodiment, as a computer readable medium storing the program(s) of the present invention, a hard disk and a nonvolatile memory, such as a flash memory, are described. The computer readable medium, however, is not limited thereto. The computer readable medium may be a portable storage medium, such as a CD-ROM. Further, as a medium to provide data of the program(s) of the present invention via a communication line, a carrier wave may be used.

In the above, one or more embodiments of the present invention have been described. However, the scope of the present invention is not limited to the embodiments, and includes the scope of claims below and the scope of their equivalents.

What is claimed is:

1. An advertisement management apparatus comprising:
   a memory having stored therein:
   a plurality of different layout types as first advertisement data components, each of the layout types being stored in association with first index values for respective items about the layout type, the first index values being set in advance and differing depending on the layout type,
   a plurality of second advertisement data components other than layout types,
   a components-selecting-purpose condition data table in which each of a plurality of advertisement uses is stored in association with components-selecting-purpose conditions for respective items related to the advertisement use, the components-selecting-purpose conditions being set in advance and differing depending on the advertisement use, and
   a learning value data table that stores learning values in association with identification information of a user, wherein the learning values indicate, for each of the advertisement uses, the user's preference about the layout types, wherein the learning values are calculated for respective items that are preset for the layout types, and wherein the learning values are calculated, with respect to each of the advertisement uses, based on a number of times the user has created an advertisement for the advertisement use and based on the associated first index values for the preset respective items of the layout types selected by the user each time the user created the advertisement for the advertisement use; and
   at least one processor that is configured to perform:
   a reception operation of receiving, via an input device, an advertisement use of an advertisement to be created that is input by the user, and receiving, via the input device, text information input by the user relating to the advertisement to be created;
   a first obtainment processing operation of:
   determining an advertisement use among the plurality of advertisement uses stored in the components-selecting-purpose condition data table that corresponds to the advertisement use input by the user, extracting, from among the plurality of different layout types stored in the memory, a plurality of layout types that are associated with index values that satisfy the components-selecting-purpose conditions associated with the determined advertisement use, calculating, for each extracted layout type, an evaluation value based on the index values set for the respective items about the layout type and the learning values associated with the user for the determined advertisement use in the learning value data table, and obtaining, based on the calculated evaluation values for the plurality of extracted layout types, a plurality of layout types from among the plurality of extracted layout types as layout candidates of the advertisement;

an extraction processing operation of extracting a word by performing text segmentation on the text information input by the user;

a second obtainment processing operation of obtaining a plurality of second advertisement data components from among the plurality of second advertisement data components stored in the memory as second advertisement data component candidates of the advertisement, based on the word extracted by the extraction processing operation;

a creation processing operation of creating a plurality of advertisement candidates by combining the plurality of layout candidates obtained by the first obtainment processing operation and the plurality of second advertisement data component candidates obtained by the second obtainment processing operation;

a selection processing operation of selecting one of the created advertisement candidates as a finished advertisement in accordance with a selection operation by the user:

an output processing operation of outputting the finished advertisement in accordance with the determined advertisement use of the advertisement; and an update processing operation of updating the learning values associated with the user in the learning value data table for the determined advertisement use based on the first index values associated with the layout type corresponding to the layout candidate included in the created advertisement candidate selected as the finished advertisement by the user.

2. The advertisement management apparatus according to claim 1, wherein the plurality of advertisement is uses include an out-store poster, an in-store poster, a website for a smartphone, a website for a personal computer, and a picture for social media.

3. The advertisement management apparatus according to claim 1, wherein, in the first obtainment processing operation, the plurality of layout types are extracted from among the plurality of different layout types stored in the memory based further on a quantity of image data input by the user.

4. The advertisement management apparatus according to claim 1, wherein the text information is one or both of:
a name of an article of commerce or a service which is a target of the advertisement; and
an advertising slogan.

5. The advertisement management apparatus according to claim 1, wherein the second obtainment processing operation includes a processing operation of deriving, from the word extracted by the extraction processing operation, evaluation values for respective second advertisement data components among the plurality of second advertisement data components stored in the memory, and obtaining the second advertisement data component candidates based on the derived evaluation values.

6. The advertisement management apparatus according to claim 1, wherein:
each of the plurality of second advertisement data components is stored in the memory in association with second index values for respective items related to the second advertisement data component, the second index values being set in advance and differing depending on a type of the second advertisement data component;

the learning value data table further stores second learning values associated with the identification information of the user, wherein the second learning values indicate, for each of the advertisement uses, the user's preference about the second advertisement data components, wherein the second learning values are calculated for respective items that are preset for the second advertisement data components, wherein the second learning values are calculated, with respect to each of the advertisement uses, based on a number of times the user has created an advertisement for the advertisement use and based on the associated second index values for the preset respective items of the second advertisement data components selected by the user each time the user created the advertisement for the advertisement use; and the second obtainment processing operation includes:
calculating, for each obtained second advertisement data component, an evaluation value based on the second index values set for the respective items related to the second advertisement data component and the second learning values associated with the user for the determined advertisement use in the learning value data table, and extracting a plurality of second advertisement data components from among the obtained second advertisement data components as the second advertisement component candidates of the advertisement, based on the calculated evaluation values.

7. An advertisement management method for an advertisement management apparatus including a memory and at least one processor, wherein the memory has stored therein (i) a plurality of different layout types as first advertisement data components, each of the layout types being stored in association with first index values for respective items about the layout type, the first index values being set in advance and differing depending on the layout type, (ii) a plurality of second advertisement data components other than layout types, (iii) a components-selecting-purpose condition data table in which each of a plurality of advertisement uses is stored in association with components-selecting-purpose conditions for respective items related to the advertisement use, the components-selecting-purpose conditions being set in advance and differing depending on the advertisement use, and (iv) a learning value data table that stores learning values in association with identification information of a user, wherein the learning values indicate, for each of the advertisement uses, the user's preference about the layout types, wherein the learning values are calculated for respective items that are preset for the layout types, and wherein the learning values are calculated, with respect to each of the advertisement uses, based on a number of times the user has created an advertisement for the advertisement use and based on the associated first index values for the preset respective items of the layout types selected by the user each time the user created the advertisement for the advertisement use, the method comprising, by the at least one processor:

a reception operation of receiving, via an input device, an advertisement use of an advertisement to be created that is input by the user, and receiving, via the input device, text information input by the user relating to the advertisement to be created;

performing a first obtainment processing operation of:
determining an advertisement use among the plurality of advertisement uses stored in the components-selecting-purpose condition data table that corresponds to the advertisement use input by the user,
extracting, from among the plurality of different layout types stored in the memory, a plurality of layout types that are associated with index values that satisfy the components-selecting-purpose conditions associated with the determined advertisement use,
calculating, for each extracted layout type, an evaluation value based on the index values set for the respective items about the layout type and the learning values associated with the user for the determined advertisement use in the learning value data table, and
obtaining, based on the calculated evaluation values for the plurality of extracted layout types, a plurality of layout types from among the plurality of extracted layout types as layout candidates of the advertisement;

performing an extraction processing operation of extracting a word by performing text segmentation on the text information input by the user;

performing a second obtainment processing operation of obtaining a plurality of second advertisement data components from among the plurality of second advertisement data components stored in the memory as second advertisement data component candidates of the advertisement, based on the word extracted in the extraction processing operation; and performing a creation processing operation of creating a plurality of advertisement candidates by combining the plurality of layout candidates obtained by the first obtainment processing operation and the plurality of second advertisement data component candidates obtained by the second selection step obtainment processing operation;

performing a selection processing operation of selecting one of the created advertisement candidates as a finished advertisement in accordance with a selection operation by the user;

performing an output processing operation of outputting the finished advertisement in accordance with the determined advertisement use of the advertisement; and performing an update processing operation of updating the learning values associated with the user in the learning value data table for the determined advertisement use based on the first index values associated with the layout type corresponding to the layout candidate included in the created advertisement candidate selected as the finished advertisement by the user.

8. The advertisement management method according to claim 7, wherein the plurality of advertisement of uses include an out-store poster, an in-store poster, a website for a smartphone, a website for a personal computer, and a picture for social media.

9. The advertisement management method according to claim 7, wherein, in the first obtainment processing operation, the plurality of layout types are extracted from among the plurality of different layout types stored in the memory based further on a quantity of image data input by the user.

10. The advertisement management method according to claim 7, wherein the text information is one or both of:
a name of an article of commerce or a service which is a target of the advertisement; and
an advertising slogan.

11. The advertisement management method according to claim 7, wherein the second obtainment processing operation includes a processing operation of deriving, from the word extracted in the extraction processing operation, evaluation values for respective second advertisement data components among the plurality of second advertisement data components stored in the memory, and obtaining the second advertisement data component candidates based on the derived evaluation values.

12. A non-transitory computer readable storage medium storing a program that is executable by a computer of an advertisement management apparatus including a memory having stored therein: (i) a plurality of different layout types as first advertisement data components, each of the layout types being stored in association with first index values for respective items about the layout type, the first index values being set in advance and differing depending on the layout type, (ii) a plurality of second advertisement data components other than layout types, (iii) a components-selecting-purpose condition data table in which each of a plurality of advertisement uses is stored in association with components-selecting-purpose conditions for respective items related to the advertisement use, the components-selecting-purpose conditions being set in advance and differing depending on the advertisement use, and (iv) a learning value data table that stores learning values in association with identification information of a user, wherein the learning values indicate, for each of the advertisement uses, the user's preference about the layout types, wherein the learning values are calculated for respective items that are preset for the layout types, and wherein the learning values are calculated, with respect to each of the advertisement uses, based on a number of times the user has created an advertisement for the advertisement use and based on the associated first index values for the preset respective items of the layout types selected by the user each time the user created the advertisement for the advertisement use, wherein the program is executable by the computer to cause the computer to perform a processing operation comprising:

a reception operation of receiving, via an input device, an advertisement use of an advertisement to be created that is input by the user, and receiving, via the input device, text information input by the user relating to the advertisement to be created;

a first obtainment processing operation of:
determining an advertisement use among the plurality of advertisement uses stored in the components-selecting-purpose condition data table that corresponds to the advertisement use input by the user,
extracting, from among the plurality of different layout types stored in the memory, a plurality of layout types that are associated with index values that satisfy the components-selecting-purpose conditions associated with the determined advertisement use,
calculating, for each extracted layout type, an evaluation value based on the index values set for the respective items about the layout type and the learning values associated with the user for the determined advertisement use in the learning value data table, and obtaining, based on the calculated evaluation values for the plurality of extracted layout types, a plurality of layout types from among the plurality of extracted layout types as layout candidates of the advertisement;

an extraction processing operation of extracting a word by performing text segmentation on the text information input by the user;

a second obtainment processing operation of obtaining a plurality of second advertisement data components from among the plurality of second advertisement data components stored in the memory as second advertisement data component candidates of the advertisement, based on the word extracted by the extraction processing operation; and a creation processing operation of creating a plurality of advertisement candidates by combining the plurality of layout candidates obtained by the first selection obtainment processing operation and the plurality of second advertisement data component candidates obtained by the second selection obtainment processing operation;

a selection processing operation of selecting one of the created advertisement candidates as a finished advertisement in accordance with a selection operation by the user;

an output processing operation of outputting the finished advertisement in accordance with the determined advertisement use of the advertisement; and an update processing operation of updating the learning values associated with the user in the learning value data table for the determined advertisement use based on the first index values associated with the layout type corresponding to the layout candidate included in the created advertisement candidate selected as the finished advertisement by the user.

13. The non-transitory computer readable storage medium according to claim 12, wherein the plurality of advertisement uses include an out-store poster, an in-store poster, a website for a smartphone, a website for a personal computer, and a picture for social media.

14. The non-transitory computer readable storage medium according to claim 12, wherein, in the first obtainment processing operation, the plurality of layout types are extracted from among the plurality of different layout types stored in the memory based further on a quantity of image data input by the user.

15. The non-transitory computer readable storage medium according to claim 12, wherein the text information is one or both of:

a name of an article of commerce or a service which is a target of the advertisement; and an advertising slogan.

16. The non-transitory computer readable storage medium according to claim 12, wherein the second obtainment processing operation includes a processing operation of deriving, from the word extracted by the extraction processing operation, evaluation values for respective second advertisement data components among the plurality of second advertisement data components stored in the memory, and obtaining the second advertisement data component candidates based on the derived evaluation values.

* * * * *

UNITED STATES PATENT AND TRADEMARK OFFICE
CERTIFICATE OF CORRECTION

PATENT NO. : 11,151,615 B2
APPLICATION NO. : 16/358264
DATED : October 19, 2021
INVENTOR(S) : Keita Anjo Page 1 of 1

It is certified that error appears in the above-identified patent and that said Letters Patent is hereby corrected as shown below:

In the Claims

Column 21, Line 36, delete "user:" and insert --user;--.
Column 21, Line 48 (Claim 2, Line 2), after "advertisement" delete "is".
Column 23, Line 44, after "second" delete "selection step".
Column 23, Line 61 (Claim 8, Line 2), after "advertisement" delete "of".
Column 25, Line 15, after "operation;" delete "and".
Column 25, Line 18, after "first" delete "selection".
Column 25, Line 21, after "second" delete "selection".
Column 25, Line 25, delete "user:" and insert --user;--.

Signed and Sealed this
Twelfth Day of April, 2022

Drew Hirshfeld
*Performing the Functions and Duties of the*
*Under Secretary of Commerce for Intellectual Property and*
*Director of the United States Patent and Trademark Office*